US011299840B2

(12) United States Patent
Jeong et al.

(10) Patent No.: US 11,299,840 B2
(45) Date of Patent: Apr. 12, 2022

(54) CLOTHES TREATMENT APPARATUS AND CONTROL METHOD THEREFOR

(71) Applicant: LG Electronics Inc., Seoul (KR)

(72) Inventors: Jaeyong Jeong, Seoul (KR); Keunjoo Kim, Seoul (KR); Aekyung Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 16/612,828

(22) PCT Filed: Jul. 4, 2018

(86) PCT No.: PCT/KR2018/007587
§ 371 (c)(1),
(2) Date: Nov. 12, 2019

(87) PCT Pub. No.: WO2019/009621
PCT Pub. Date: Jan. 10, 2019

(65) Prior Publication Data
US 2020/0181827 A1    Jun. 11, 2020

(30) Foreign Application Priority Data

Jul. 4, 2017  (KR) .......................... 10-2017-0084662
Jul. 4, 2017  (KR) .......................... 10-2017-0084688

(51) Int. Cl.
*D06F 23/04*   (2006.01)
*D06F 37/16*   (2006.01)
(Continued)

(52) U.S. Cl.
CPC ............... *D06F 37/16* (2013.01); *D06F 1/04* (2013.01); *D06F 33/62* (2020.02); *D06F 37/26* (2013.01);
(Continued)

(58) Field of Classification Search
CPC .......... D06F 18/00; D06F 29/00; D06F 31/00; D06F 21/00; D06F 21/06; D06F 21/08;
(Continued)

(56) References Cited

U.S. PATENT DOCUMENTS 2,973,637 A * 3/1961 Sisson .................. D06F 39/10
68/23.4
5,249,441 A * 10/1993 Pastryk ............... D06F 35/006
68/23.4
(Continued)

FOREIGN PATENT DOCUMENTS

CN    1389616    1/2003
CN    2592690    12/2003
(Continued)

OTHER PUBLICATIONS

Australian Examination Report dated May 23, 2020 for Application No. 2018296992.
(Continued)

*Primary Examiner* — David G Cormier
(74) *Attorney, Agent, or Firm* — Birch, Stewart, Kolasch & Birch, LLP

(57) ABSTRACT

A laundry treating apparatus includes a tub configured to hold wash water, a drum rotatably supported in the tub and including a shaft disposed perpendicular with the ground, and a sub-drum detachably mounted to the drum and configured to wash laundry independently from the drum. The sub-drum includes a discharging area in which a discharging path is defined to selectively discharge the wash water in the sub-drum by a centrifugal force generated by rotation of the sub-drum. A check valve is included in the discharging area
(Continued)

and is configured to selectively open and close the discharging area when acted on by an external force applied by the centrifugal force generated by the rotation of the sub-drum.

12 Claims, 14 Drawing Sheets

(51) Int. Cl.
*D06F 33/62* (2020.01)
*D06F 1/04* (2006.01)
*D06F 37/26* (2006.01)
*D06F 39/08* (2006.01)
*D06F 39/12* (2006.01)

(52) U.S. Cl.
CPC .............. *D06F 39/08* (2013.01); *D06F 39/12* (2013.01); *D06F 39/083* (2013.01)

(58) Field of Classification Search
CPC .......... D06F 23/04; D06F 37/12; D06F 37/14; D06F 37/24; D06F 39/00; D06F 39/08; D06F 39/083; D06F 33/40; D06F 33/60; D06F 35/007; D06F 2202/10; D06F 2204/06; D06F 2204/065; D06F 58/00; D06F 58/02; D06F 58/203; D06F 58/30; D06F 2202/00–12; D06F 2204/00–10; D06F 2210/00; D06F 2212/00; D06F 2212/02; D06F 2212/04; D06F 2212/06; D06F 2214/00; D06F 2216/00; D06F 2220/00; D06F 2222/00; D06F 2224/00; D06F 2226/00

See application file for complete search history.

(56) References Cited

U.S. PATENT DOCUMENTS

| | | | |
|---|---|---|---|
| 10,975,508 B2* | 4/2021 | Kim | ........................ D06F 31/00 |
| 2015/0184326 A1 | 7/2015 | Seo et al. | |
| 2018/0119327 A1 | 5/2018 | Kim et al. | |
| 2019/0145038 A1 | 5/2019 | Kim et al. | |

FOREIGN PATENT DOCUMENTS

| | | |
|---|---|---|
| CN | 104428458 | 3/2015 |
| CN | 205806580 | 12/2016 |
| JP | H06154475 | 6/1994 |
| JP | H06238094 | 8/1994 |
| JP | 2005-006689 | 1/2005 |
| KR | 10-2000-0033777 | 6/2000 |
| KR | 10-2003-0045447 | 6/2003 |
| KR | 10-2005-00796764 | 8/2005 |
| KR | 10-2015-0077059 | 7/2015 |
| KR | 10-2016-0127681 | 11/2016 |
| WO | WO 2017/188754 | 11/2017 |

OTHER PUBLICATIONS

Written Opinion of the International Search Authority dated Oct. 18, 2018.

Chinese Office Action dated Mar. 3, 2021 for Application No. 201880039488.5.

* cited by examiner

CLOTHES TREATMENT APPARATUS AND CONTROL METHOD THEREFOR

CROSS-REFERENCE TO RELATED APPLICATIONS

This application is the National Phase of PCT International Application No. PCT/KR2018/007587, filed on Jul. 4, 2018, which claims priority under 35 U.S.C. 119(a) to Korean Patent Applications Nos. 10-2017-0084662, filed on Jul. 4, 2017 and 10-2017-0084688 filed on Jul. 4, 2017, all of which are incorporated by reference herein in their entireties.

FIELD

Embodiments of the present disclosure relate to a laundry treating apparatus and a control method of the same, more particularly, to a laundry treating apparatus which includes a sub-drum additionally mounted in a drum so as to perform laundry-treating in both of the drum and sub-drum.

BACKGROUND

Generally, a laundry treating apparatus includes a washer configured to perform washing, a dryer configured to perform drying and a laundry machine with washing and drying functions configured to perform both washing and drying.

Such a laundry treating apparatus used as the washer may include a cabinet defining an external appearance; a tub mounted in the cabinet and configured to hold wash water; a drum rotatably provided in the tub and configured to wash clothes or laundry; and a door coupled to the door and provided to facilitate the loading and unloading of the clothes or laundry.

The laundry treating apparatus may be classified into a top loading type having a drum shaft which vertically stands with respect to the ground and a front loading type having the drum shaft which is horizontally arranged in parallel with the ground.

In the front type laundry treating apparatus, the drum shaft is substantially parallel with the ground and the washing is performed by using a frictional force between the laundry, the drum rotated by the drive force of a motor and the drop impact of the laundry, in a state where detergent, wash water and laundry are loaded in the drum. The drum washing method avoids damaging or entangling the laundry, while having a washing effect like hand-rubbing-and-striking.

In the top loading type laundry apparatus, the drum shaft is substantially vertical with respect to the ground and the drum is mounted in the tub where wash water is held. The washing is performed in a state where the laundry is submerged in the wash water supplied to the drum and the top loading drum laundry apparatus is categorized into a pulsator type and an agitator type. The pulsator type includes a pulsator which is rotatably oriented in a bottom of the drum configured to accommodate wash water and laundry and rotates the wash water and the laundry by rotating the pulsator so as to perform the washing. The agitator type includes an agitator which is projected from the bottom of the drum upwardly and rotates the wash water and the laundry by rotating the agitator so as to perform the washing.

The top loading type laundry treating apparatus is configured to perform the washing by using both the friction between the wash water and the laundry and the chemical action of the detergent which are facilitated by the rotation of the drum or the agitator or pulsator which is provided in the bottom of the drum to create water currents. Accordingly, wash water has to be supplied enough to submerge the laundry to perform the washing in the top loading type laundry treating apparatus and the top loading type laundry treating apparatus requires much wash water.

In the conventional laundry treating apparatus, a washing course, more specifically, the washing course configured of a wash cycle, a rinse cycle and a dry-spin cycle may be performed in one drum. If the laundry has to be sorted based on fabric materials, the washing course has to be performed at least two times and more operations of the laundry treating apparatus have to be performed. Accordingly, the conventional laundry treating apparatus has some disadvantages of detergent waste and energy consumption.

To solve such disadvantages, a laundry treating apparatus according to various embodiments of this disclosure may include a sub-drum detachably mounted in the drum. Such a sub-drum may accommodate water, independent from the tub, and water currents may be formed in the sub-drum by the rotation of the sub-drum so as to perform an additional washing course independently from a washing course performed in the drum.

Washing in the main-drum and washing in the sub-drum according to various embodiments of this disclosure may be independently performed. More specifically, the wash water held in the main-drum may not be mixed with the water held in the sub-drum. If the wash water held in the main-drum and the sub-drum is mixed, a potential problem may include dyeing of the laundry. Also, the detergent used for the laundry in the main-drum could be different from the detergent used for the laundry in the sub-drum.

More specifically, embodiments of this disclosure may avoid mixing the supplied water with the drained water. Accordingly, a laundry treating apparatus according to various embodiments of this disclosure effectively facilitates such independent washing processes.

The sub-drum may be an element detachably mounted in the drum. Accordingly, it may be difficult to install a mechanism that is operable once electric currents are applied to the sub-drum and then drain the wash water from the sub-drum properly. That is because it is not easy to connect such an element as a drainage pump with the sub-drum. Accordingly, a laundry treating apparatus according to embodiments of this disclosure is able to properly drain wash water at a proper point of time by using a mechanical or structural device, not an electric device.

SUMMARY

Technical Problem

To overcome the disadvantages of conventional laundry treating apparatus, an aspect of the present disclosure is to solve the above-noted problems.

Another aspect of the present disclosure is to provide a laundry treating apparatus which includes a sub-drum easily mountable in a main-drum and which may independently separate the washing for the main-drum from the washing for the sub-drum. A laundry treating apparatus according to aspects of this disclosure may substantially separate water supply and water drainage from each other.

Furthermore, a further aspect of the present disclosure is to provide a laundry treating apparatus which may achieve a sufficient washing effect by using only the sub-drum.

A still further aspect is to provide a laundry treating apparatus which may allow a user to additionally load laundry into the main-drum as well as the sub-drum.

A still further aspect is to provide a laundry treating apparatus which may effectively discharge wash water from the sub-drum, without the discharged wash water being drawn into the main-drum.

A still further aspect is to provide a laundry treating apparatus which may discharge the wash water held in the sub-drum only in a dry-spinning cycle, without discharging the wash water in a washing cycle. A laundry treating apparatus according to aspects of this disclosure may include a water discharging structure without an auxiliary drive unit such as a drainage pump connected with the sub-drum.

A still further aspect is to provide a sub-drum having a reliable drainage structure and a laundry treating apparatus including the sub-drum.

Yet another aspect may include providing a laundry treating apparatus which includes a check valve configured to perform drainage based on RPM of the sub-drum. In other words, the drainage is allowed only at a specific RPM and a drainage point of time may be controlled precisely and effectively.

A still further aspect is to provide a sub-drum which may easily form a drainage structure configured of a check valve, and a laundry treating apparatus which includes the sub-drum. In other words, while the sub-drum is fabricated by assembling a plurality of components, the drainage structure may be formed and the sub-drum may be easy to fabricate.

A still further aspect is to provide a laundry treating apparatus which may protect a check valve and effectively prevent an error of a check valve caused by external interference by mounting the check valve in a drainage unit.

Technical Solution

A laundry treating apparatus according to various exemplary embodiments of this disclosure comprises a tub provided to hold wash water; a drum rotatably supported in the tub and comprising a shaft which is perpendicular with the ground; a sub-drum detachably mounted to the drum and configured to wash laundry, independent from the drum, wherein the sub-drum includes a discharging area forming a discharging path to selectively discharge the wash water held in the sub-drum by a centrifugal force generated by the rotation of the sub-drum; and a check valve configured to selectively open and close the discharging area by using an external force applied by the centrifugal force generated by the rotation of the sub-drum.

The discharging area may provide a resistance when wash water is discharged in the structure and the check valve may open and close the discharging area selectively.

The centrifugal force of the rotating sub-drum may be applied to the check valve as it is.

The external shock applied to the check valve may be the water pressure of the wash water as well as the centrifugal force. The centrifugal force and the water pressure may be applied to the check valve in combination.

Both the centrifugal force and the water pressure may be the external force applied to the check valve to be moved or deformed so as to open the discharging area.

One of the centrifugal force and the water pressure may be the external force applied to keep the closed state of the discharging area. As one example, the external force generated by the centrifugal force may allow the discharging area to keep the closed state and the water pressure may allow the discharging area to be open. When the external force generated by the water pressure generated by the centrifugal force is larger than the external force generated by the centrifugal force, the check valve may be deformed or moved. In this instance, the check valve may open the discharging area at a higher RPM.

The discharging area comprises a chamber provided independently from a space in which washing is performed and supplied wash water from the sub-drum; an inlet hole provided to draw the wash water into the chamber; and an outlet hole provided to discharge the wash water from the chamber outside the sub-drum.

A cross section area of the chamber may be larger than cross section areas of the inlet and outlet holes.

The outlet hole may be located in an outer upper area with respect to a radial direction of the inlet hole.

The check valve may be provided in the chamber and the inside of the chamber is the space protected from outside. The check valve is able to be moved or deformed in the space. Accordingly, the check valve may be prevented from being damaged by the external shock.

The check valve may be provided to selectively open and close the inlet hole.

The check valve may comprise a check valve body comprising a fixing end configured to fix one side of the check valve; and a free end configured to move the other side of the check valve within the chamber by a centrifugal force.

The check valve may selectively open and close the discharging area by locating or spacing the check valve body in close with or a preset distance apart from the inlet hole.

The inlet hole may be provided between the fixing end and the free end, and the inlet hole may be closer to the fixing end than the free end.

The check valve may selectively open and close the discharging area by the free end's bending generated by the centrifugal force and the free end's rotation caused by a hinge unit.

The check valve may comprise a check valve body comprising a fixing end configured to fix one side; and a free end configured to be movable within the chamber by a water pressure generated by a centrifugal force.

The check valve may be movable from a first position for closing the discharging area to a second position for opening the discharging area by the water pressure of the wash water.

The check valve may be located in the second position as bending in the reverse direction of a direction at which the centrifugal force is actuated from the first position.

The free end of the check valve may be located in an outer area with respect to the radial direction, compared with the fixing end.

The laundry treating apparatus may further comprise a stopper provided above the check valve within the chamber to restrict deformation or a rotation angle of the check valve.

The sub-drum may comprise a sub-drum body having a container-like shape to accommodate wash water and laundry; and a sub-drum cover coupled to the sub-drum body from a top of the sub-drum body and having a laundry introduction opening for loading the laundry.

The discharging area may be formed in the sub-drum cover.

The sub-drum cover may comprise a lower cover having the inlet hole and the outlet hole formed therein; and an upper cover coupled to a top surface of the lower cover and provided to define the chamber together with the lower cover.

The lower cover may be integrally formed with the sub-drum body or coupled to the sub-drum body.

The upper cover may downwardly press and fix one side of the check valve as coupled to the lower cover.

The check valve comprises an opening/closing member comprising a fixing end fixed to the chamber; a free end spaced apart towards the center of the sub-drum from the fixing end and bent to cross a direction of the centrifugal force; and a body provided to connect the fixing end and the free end with each other and provided to open and close the inlet hole by being located above the inlet hole to receive a water pressure via the inlet hole.

The check valve may be deformed by a bending stress actuated by the centrifugal force applied to the free end.

The free end of the check valve may be rotated by at least one of the centrifugal force and the water pressure.

The inlet hole may be provided between the fixing end and the free end and located closer to the fixing end than the free end.

The check valve may further include a fixing area provided to couple the fixing end to an inner surface of the chamber; a bent area bent upwardly from the free end; and a projected area projected from the body and configured to be inserted in the inlet hole.

The lateral wall of the chamber is gently curved and the plurality of the opening/closing member may be provided in the lateral wall of the chamber, spaced apart from each other.

An opening/closing guide may be further provided between each two of the opening/closing members.

The inlet hole may be provided in the lower area of the chamber and the outlet hole may be provided in the upper area of the chamber.

The inlet hole may be spaced a preset distance apart from a circumferential surface of the sub-drum.

The outlet hole may be slit longitudinally extended in a circumferential direction of an upper end of the sub-drum.

The laundry treating apparatus may further comprise a balancer provided along the circumferential surface of the upper end of the drum; and a tub cover coupled to an upper end of the tub and provided above the balancer. The outlet hole may be provided between the balancer and the tub cover.

The sub-drum may further comprise a body provided to accommodate laundry and wash water; and a sub cover coupled to an upper area of the body and having a laundry introduction opening formed therein. The discharging area may be formed in the sub cover.

The sub cover may comprise a lower cover having the inlet hole and the outlet hole formed therein; and an upper cover coupled to a top of the lower cover and provided to form the chamber.

The upper cover may downwardly press one side of the check valve as coupled to the lower cover.

A handle may be provided in the upper cover.

A cross sectional area of the drum may be formed circular and the sub-drum comprises a coupling area coupled to an inner circumferential surface of the drum; and a spaced area spaced a preset distance apart from the inner circumferential surface of the drum.

The coupling area and the spaced area of the sub-drum may be alternately provided along the circumference of the upper end of the sub-drum.

The discharging area may be provided adjacent to the coupling area.

The sub-drum comprises a body to accommodate laundry and wash water; and a sub cover coupled to an upper area of the body and having a laundry introduction opening formed therein. The sub cover may comprise a handle unit formed by recessing one side of the sub cover.

The handle unit may be provided adjacent to the coupling area.

The discharging area may be provided in each of both ends of the handle unit.

In a further aspect, the check valve may comprise an opening/closing member comprising a fixing end fixed in the chamber; a free end spaced apart from the fixing end in a direction getting farther from the center of the sub-drum; and a body provided to connect the fixing end and the free end with each other and formed in an upper area of the inlet hole to open and close the inlet hole while receiving a water pressure via the inlet hole.

The check valve may be movable from a first position for closing the discharging area to a second position for opening the discharging area by the water pressure of the wash water by the water pressure.

The check valve may be located in the second position as bending in the reverse direction of a direction at which the centrifugal force is actuated from the first position.

The check valve comprises a fixing area provided to couple the fixing end to an inner surface of the chamber; a mass upwardly projected from the free end; and a projected area provided in the body and configured to be inserted in the inlet hole.

The chamber may be gently curved along a circumferential surface of the sub-drum and the plurality of the opening/closing members may be gently curved to be arranged on a cross sectional area of the chamber, spaced a preset distance apart from each other.

The check valve may be located to the second position as rotated in the reverse direction of a direction at which the centrifugal force is actuated from the first position.

The check valve may comprise an opening/closing member comprising one end oriented towards the center of the sub-drum and the other end located in opposite to one end; and a hinge unit rotatably coupled to one end of the opening/closing member.

The opening/closing member may comprise a projected area provided to surround the inlet hole.

The check valve may further comprise a stopper provided to an upper area of the hinge unit to restrict a rotational angel of the opening/closing member.

The inlet hole may be provided between the fixing end and the free end and located closer to the free end than the fixing end, Detailed characteristics of the embodiments may be realized combinedly in other embodiments, only if they are contradictory or exclusive.

Advantageous Effects

The embodiments have following advantageous effects. According to the embodiments of the present disclosure, the laundry treating apparatus includes a sub-drum easily mountable in a main-drum and which may independently separate the washing for the main-drum from the washing for the sub-drum. A laundry treating apparatus according to various exemplary embodiments of this disclosure may substantially separate water supply and water drainage from each other.

Furthermore, the laundry treating apparatus may achieve a sufficient washing effect by using only the sub-drum.

Still further, the laundry treating apparatus may allow a user to additionally load laundry into the main-drum as well as the sub-drum.

Still further, the laundry treating apparatus may effectively discharge wash water from the sub-drum, without being drawn into the main-drum.

Still further, the laundry treating apparatus may discharge the wash water held in the sub-drum only in a dry-spinning cycle, without discharging the wash water in a washing cycle. The laundry treating apparatus may include a water discharging structure, without an auxiliary drive unit such as a drainage pump connected with the sub-drum.

Still further, the laundry treating apparatus which may prevent water leakage to a sensor provided in a tub cover to sense the rotation of the sub-drum during the washing and which discharge the water collected in the tub cover fast, while preventing the water from flowing back up to an outlet hole provided to discharge.

Still further, the laundry treating apparatus may discharge the wash water held in the sub-drum only in a dry-spinning cycle, without discharging the wash water in a washing cycle. The laundry treating apparatus may include a water discharging structure, without an auxiliary drive unit such as a drainage pump connected with the sub-drum.

Still further, the sub-drum may have a reliable drainage structure and a laundry treating apparatus may include the sub-drum.

Still further, the laundry treating apparatus may include a check valve configured to perform drainage based on RPM of the sub-drum. In other words, the drainage is allowed only at a specific RPM and a drainage point of time may be controlled precisely and effectively.

Still further, the sub-drum may easily form a drainage structure configured of a check valve, and the laundry treating apparatus may include the sub-drum. In other words, while the sub-drum is fabricated by assembling a plurality of components, the drainage structure may be formed and the sub-drum may be easy to fabricate.

Still further, the laundry treating apparatus may protect a check valve and effectively prevent an error of a check valve caused by external interference by mounting the check valve in a drainage unit.

DETAILED DESCRIPTION

Referring to the accompanying drawings, exemplary embodiments of the present disclosure will be described in detail. Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
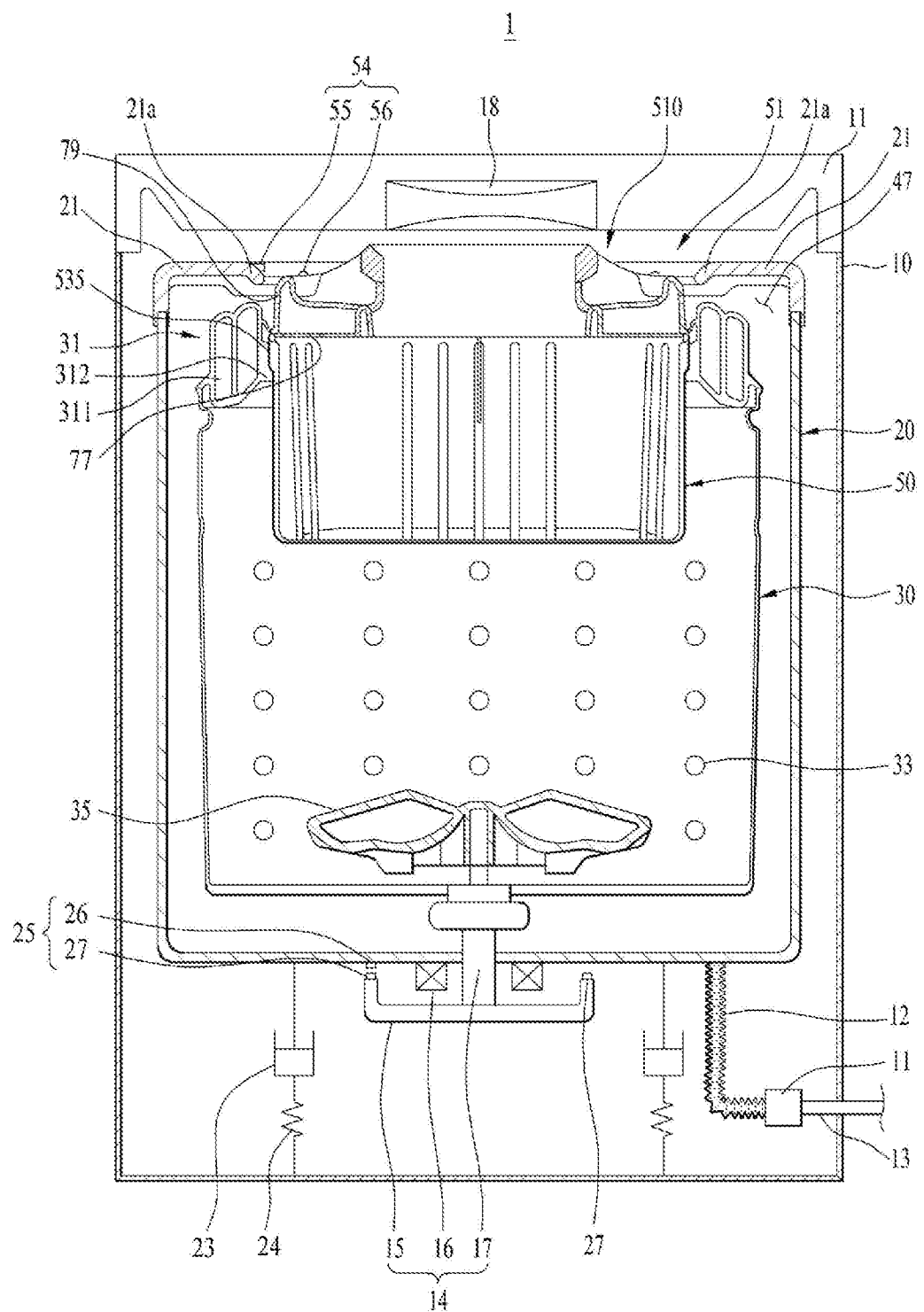
FIG. 1 is a schematic diagram illustrating a structure of a laundry treating apparatus in accordance with one embodiment of the present disclosure.

FIG. 1 is a schematic diagram illustrating a structure of a laundry treating apparatus 1 in accordance with one embodiment of the present disclosure;

Referring to FIG. 1, the laundry treating apparatus 1 in accordance with the embodiment includes a cabinet 10 having an opening formed in an upper portion to load clothes or laundry (hereinafter, the laundry); a door (not shown) coupled to the opening to open and close the opening; a tub 20 mounted in the cabinet 10 and configured to store wash water; and a drum 30 rotatably mounted in the tub 20.

The laundry treating apparatus may further include a drive unit 14 configured to drive the drum 30; and a pulsator 35 configured to rotate in the drum 30 so as to form water currents in the wash water supplied to the drum and the tub.

The drive unit 14 may be provided to selectively rotate the drum 30 and the pulsator 35.

Meanwhile, the laundry treating apparatus in accordance with the embodiment includes a sub-drum 50 detachably mounted in the drum 30 and configured to perform washing, independent from the washing in the drum 30.

In the embodiments of the present disclosure, the wash water for washing the laundry and the wash water for washing the door and the like are referred to as 'the wash water' and the drum 30 is referred to as 'the main-drum'.

FIG. 1 shows a direct-type motor drive structure which directly connects the motor to a shaft 17 to drive the drum 30. However, the laundry treating apparatus 1 in accordance with the illustrated embodiment is not limited thereto.

The cabinet 10 may define the exterior appearance of the laundry treating apparatus 1 and include a cabinet cover 11 having an opening to communicate the inside of the cabinet with the outside so as to load the laundry.

The cabinet cover 11 is provided in an upper end of the cabinet 10 and the door (not shown) is rotatably coupled to a top of the opening to selectively open and close the opening. Accordingly, a user is able to load or unload the laundry into or from the drum 30 and the sub-drum by opening and closing the door.

Meanwhile, a water supply unit 18 is provided in the cabinet cover 11 to supply the water mixed with detergent or clean water with no detergent to the drum 30 and the sub-drum 50. The wash water exhausted from the water supply unit 18 may be supplied to the drum 30 and/or the sub-drum 50.

The wash water exhausted from the water supply unit 18 may be supplied only to the drum 30 or only to the sub-drum 50. A laundry accommodating space of the drum 30 may be separated from a laundry accommodating space of the sub-drum 50, and the wash water supplied to the drum 30 may be separated from the wash water supplied to the sub-drum 50. In other words, the supply of the wash water supplied to the sub-drum 50 and to the drum 30 may be limited, because a contamination level or fabric type of the laundry loaded in the drum could be different from a contamination level or fabric type of the laundry loaded in the sub-drum. Accordingly, the laundry and the wash water supplied to the drum may be separated from the laundry and the wash water supplied to the sub-drum.

In the illustrated embodiment, the wash water is selectively supplied to the drum 30 or the sub-drum 50 via the inside of the tub 20 based on the rotation of the sub-drum 50. In other words, the wash water may be directly supplied to the internal space of the drum 30, not passing through the internal space of the sub-drum and the internal space of the sub-drum 50, not passing through the internal space of the drum 30. The wash water supplied to the drum 30 and the wash water supplied to the sub-drum 50 are not mixed during the wash cycle and it is preferred that they are not mixed in the internal space of the drum 30 and the internal space of the sub-drum 50 even during the dry-spin cycle and the water drainage process.

The tub 20 is formed in a cylinder shape with an open top and mounted in the cabinet 10 to accommodate the wash water. The tub 20 includes a tub cover 21 installed to an upper end.

The tub cover 21 may be located higher than an upper end of the drum 30 and an upper end of the sub-drum 50 mounted in the drum 50. A laundry introduction opening 580 is formed in the tub cover 21, corresponding to the opening of the cabinet 10. The laundry may be loaded into the drum or the sub-drum via the laundry introduction opening 580.

A lower surface of the tub 20 is flexibly supported by a spring 24 and a damper 23 which are installed in the cabinet 10. As the lower surface is directly supported by the spring 24 and the damper 23, the tub 20 cannot be rotary as it is so that the tub may not be provided with an auxiliary rotational force by the drive unit 14, different from the drum 30. FIG. 1 shows that the spring 24 and the damper 23 are serially connected to the lower surface of the tub 20 and the embodiments of the present disclosure are not limited thereto. If necessary, the spring 24 and the damper 23 may be connected to the lower surface in parallel. Alternatively, the damper 23 may be connected to the lower surface of the tub 20 and the spring 24 may be connected to an upper surface of the tub 20 and vice versa.

A drainage mechanism configured to drain water may be connected to the lower surface of the tub 20. The drainage mechanism includes a drainage pump 11 for providing a power to drain the wash water held in the tub 20; a first drainage pipe 12 having one end connected to the lower surface of the tub and the other end connected with the drainage pump 11 so as to guide the wash water toward the drainage pump 11; and a second drainage pipe 13 having one end connected with the drainage pump 11 and the other end connected with one side of the cabinet 10 so as to drain the wash water outside the cabinet 10 from the drainage pump 11. The first drainage pipe 12 may be a bellows pipe not to transfer the vibration of the tub 20 to the drainage pump 11.

The drive unit 14 includes a motor configured of a rotor 15 and a stator 16; and a shaft 17 connected with the rotor 15. As a clutch (not shown) is provided in the drive unit 14, the drive force may be transferred to the drum 30 and the pulsator 35. For example, when the shaft 17 is selectively coupled to the drum 30 in a state of being fixed to the pulsator 35, the drive unit 14 may transfer the drive force to the pulsator 35 or both of the pulsator 35 and the drum 30.

As another example, the shaft 17 is selectively coupled to the pulsator in a state of being fixed to the drum 30 and the drive unit 14 may then transfer the drive force to the drum 30 or both of the pulsator 35 and the drum 30.

As mentioned above, the shaft 17 may be fixed to one of the pulsator 35 and the drum 30 and selectively coupled to the other one. However, such the description may not exclude the structure configured to selectively couple the shaft only to the pulsator 35 or the drum 30.

The laundry treating apparatus 1 in accordance with one embodiment includes the drum 30 rotatably mounted in the tub 20 and configured to hold clothes or laundry; and the sub-drum 50 detachably mounted in the drum 30.

The drum 30 may be formed in a cylinder shape with an open top and an approximately circular cross-section and a lower surface directly connected with the shaft 17 to receive the rotational force from the drive unit 14.

The drum 30 may be formed in the cylinder shape with the open top and a plurality of through-holes may be formed in a lateral wall, in other words, a circumferential surface. The drum 30 may be in communication with the tub 20 via the plurality of the through-holes 33. Accordingly, when wash water is supplied to the tub 20 to a preset water level or more, the drum 30 becomes submerged in the wash water and some of the wash water may flow into the drum via the through-holes 33.

The drum 30 includes a drum cover 31 provided in an upper end. The drum cover 31 is formed in a hollow ring shape and arranged in a lower area of the tub. An outlet path 47 is horizontally extended by the upper surface of the drum cover 31 and the lower surface of the tub cover 21. The outlet path 47 may be provided to guide the wash water exhausted outside via a lateral surface of the sub-drum 50 toward the inside of the tub 20 again.

Meanwhile, the tub cover 21 includes a cover bent area 21a obliquely bent from the inner circumferential surface of the laundry introduction opening 580 towards the inside of the tub cover 21.

The cover bent area 21a may be provided to guide the water drawn and falling into the drum 30 while rotated and circulated along the inner circumferential surface of the tub by the rotational force of the drum 30. The laundry loaded in the drum 30 may be effectively washed by the water currents of the wash water (hereinafter, "Alpha water currents"). However, the washing process using such the water currents may be performed only in a state where the sub-drum 50 is not mounted in the drum 30, because the wash water loaded in the drum is mixed with the wash water loaded in the sub-drum. When washing for the laundry loaded in the drum 30 and the sub-drum 50 is performed after the sub-drum 50 is mounted in the drum 30, which will be described later, the drive unit may be controlled not to generate such the alpha water currents.

The wash water held in the drum 30 is drawn toward inner and lower walls of the tub via the through-holes 33 of the drum 30 and then drained. The wash water held in the sub-drum 50 is drawn toward the inner wall of the tub via the top of the sub-drum 50. In other words, the wash water is flowing in a side gap between the drum 30 and the tub 20 via the outlet path 47 and then to the lower wall of the tub to be drained outside. Accordingly, the wash water held in both the drum 30 and the sub-drum 50 is not mixed with each other in the drum 30 and the sub-drum 50, when drained outside. Also, the wash water supplied to both the drum 30 and the sub-drum 50 is not mixed with each other.

The drum cover 31 has an opening so as to load the laundry or mount the sub-drum 50 therein. Also, the drum-cover 31 also has a balancer 311 provided to compensate the unbalance caused by the eccentric load of the laundry in the drum.

The drum cover 31 may include a first uneven portion 315 formed in an inner circumferential surface to facilitate the demounting of the sub-drum 50; and an hooking portion 312 projected from the inner circumferential surface to prevent the upward movement of the drum 30 by interfering with a coupling unit 93 of the sub-drum 50 which is provided to be coupled to the first uneven portion 315. In this instance, the coupling unit 93 is able to be flexibly movable into or from the sub-drum 50, in communication with a handle unit 510.

Figure 5:
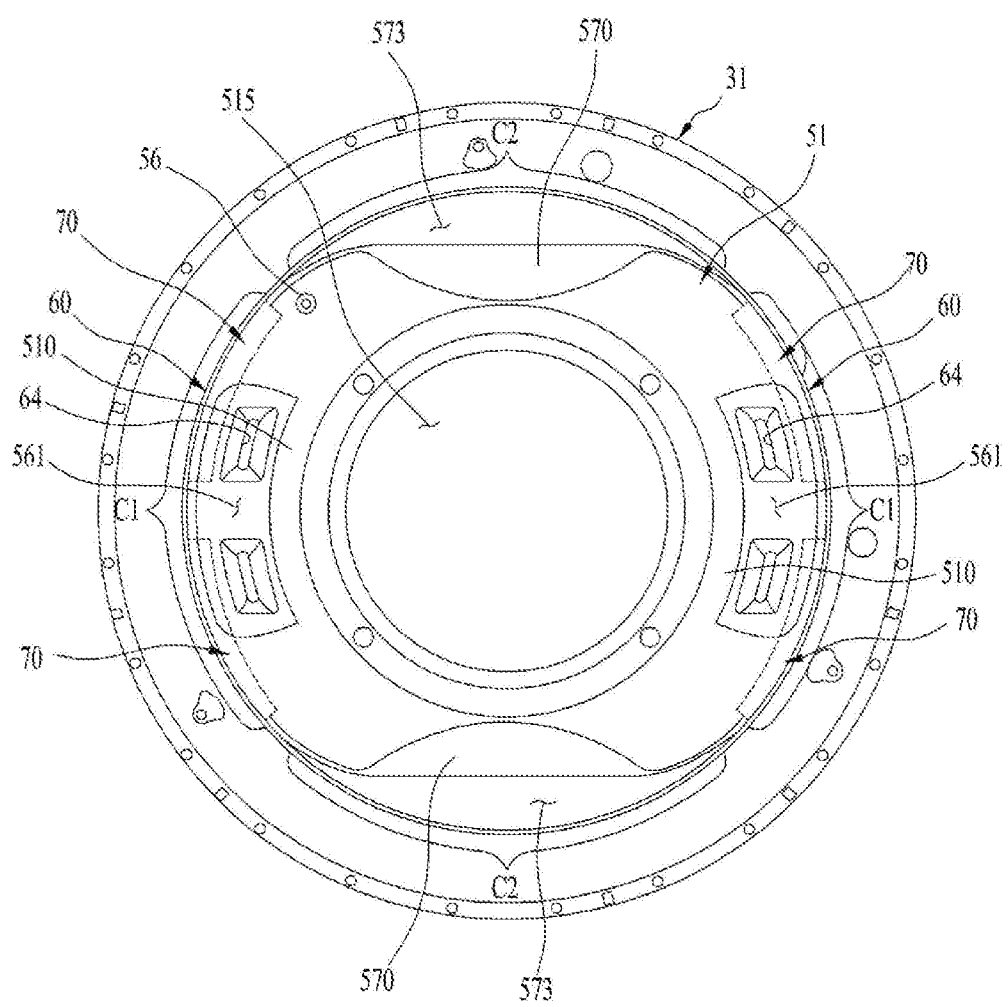
FIG. 5 is a plane view illustrating the sub-drum mounted in a drum.
Figure 6:
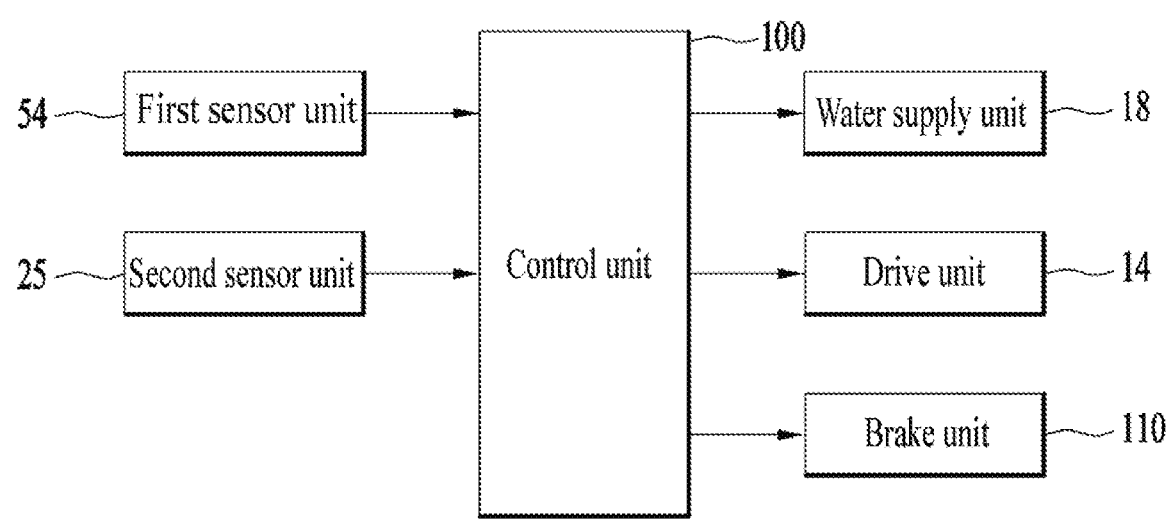
FIG. 6 is a block diagram illustrating the structure of the laundry treating apparatus in accordance with the embodiment.

Meanwhile, the laundry treating apparatus in accordance with the embodiment may include a control unit (500, see FIG. 5 and a brake unit (110, see FIG. 5) so as to control the overall washing process. Also, the laundry treating apparatus may include a sensor unit configured to control an angle of the sub-drum 50 which will be described later. The sensor unit may include a first sensor unit 54 and a second sensor unit 25. The angle control of the sub-drum 50 may be performed for the water supply. As one example, it may be determined based on the angle control of the sub-drum 50 whether to perform the water supply to the inside of the drum 30 via the same water supply unit or to the inside of the sub-drum 50.

The first sensor unit 54 may include a first hall sensor 55 and a first magnet unit 56. The first hall sensor 55 may be provided in an upper surface of the tub cover or an inner circumference of the tub cover 20. In other words, the first hall sensor 55 may be provided in one of the fixed elements. The first magnet unit 56 may be installed on an upper surface of the sub-drum to be sensed by the first hall sensor 55.

When the sub-drum 50 is rotated, the first hall sensor 55 senses the first magnet unit 56 and transmits a signal to the control unit 100. In the illustrated embodiment, one hall sensor and one magnet are provided in the first sensor unit 54 for easy understanding. However, the embodiments of the present disclosure are not limited thereto and the first sensor unit 54 may include a plurality of hall sensors and a plurality of magnets. Or, it may include one hall sensor and the plurality of the magnets. The plurality of the magnets may be arranged at intervals having a preset angle. When one magnet is provided in one hall sensor, the hall sensor may generate one magnet sensing signal per one rotation of the sub-drum 50. When three magnets are provided in one hall sensor, the hall sensor may generate three magnet sensing signals per one rotation of the sub-drum 50. The first sensor unit 54 may determine whether the sub-drum 50 is mounted in the drum 30. Also, the first sensor unit 54 may determine whether the sub-drum 50 is mounted in the drum 30 normally.

As one example, when the first hall sensor 55 generates three magnet sensing signals per one rotation of the drum 30, the first hall sensor 55 may generate only two magnet sensing signals. In this instance, it may be determined that the sub-drum 50 is mounted in the drum abnormally.

When it is determined that the sub-drum 50 is mounted in the drum 30 normally, the sub-drum 50 and the drum 30 may be integrally rotated as one body. In other words, the rotation angle of the sub-drum 50 may be controlled by controlling the rotation angle of the drum 30.

In this embodiment, the second sensor unit 25 may be provided to control the rotation angle of the drum 30. More specifically, the sensor unit 25 may be provided to sense the rotation angle of the drum 30 and the rotation angle of the drum 30 may be controlled based on the result of the sensing of the second sensor unit.

More specifically, the second sensor unit 25 may include one second hall sensor 26 and a second magnet unit 27 so as to sense the rotation angle of the drum 30. The second hall sensor 26 may be provided on a bottom surface of the tub 20 and magnets of the second magnet unit 27 may be arranged along an outer circumference of a top surface of the rotor 15 to be sensed by the second hall sensor 26. When the drum 30 is rotated, the second hall sensor 26 senses the rotation angle of the drum 30 and then transmits a signal to the control unit 100. To allow the second sensor unit 25 to sense the precise rotation angle of the drum 30, the magnets of the second magnet unit 27 are provided on the rotor 15 at the equidistant intervals. The more magnets are provided, the more precise rotation angle of the drum may be sensed. In other words, the rotation angle of the drum 30 is determined based on the rotation angle of the rotor 15 sensed by the second sensor unit 25. Meanwhile, the second sensor unit 25 may include the hall sensor fixedly provided on the stator; and a plurality of magnets provided on the rotor and rotatable together with the rotor.

Meanwhile, the rotation angle of the rotor 15 may be sensed without auxiliary sensor. In other words, the rotation angle of the rotor 15 may be sensed according to a sensorless method to determine the rotation angle of the drum 30. Such a sensorless method may be configured to allow a phase current of a preset frequency to flow to the motor and estimate the location of the rotor provided in the motor based on the output currents detected while the currents of the preset frequency flow to the motor. Such the sensorless method is well-known knowledge and detailed description thereof will be omitted accordingly.

The control unit 100 is configured to control the overall operation of the laundry treating apparatus (e.g., the wash cycle, the rinse cycle, the dry-spin cycle and the like) and operate the laundry treating apparatus according to the user's setting.

Especially, the control unit 100 may be implemented to receive the signals generated by the first sensor unit 54 and the second sensor unit 25 and control the drive unit 14 configured to rotate the drum 30, the water supply unit 18 configured to supply wash water and the brake unit 110 configured to apply a brake to the rotating drum 30 based on the received signals. The control unit may perform the control of the rotation angle of the sub-drum 50 based on the control of the rotation angle of the drum 30. In other words, the control unit may control the sub-drum 50 to stop at a desired rotation angle.

The brake unit 110 is implemented to stop the drum 30 by applying a brake to the rotating drum 30. In other words, the control unit may control the drum 30 and the sub-drum 50 to stop at a preset rotation angle.

Hereinafter, the sub-drum 50 will be described in detail, referring to FIGS. 2 through 4.

Figure 2:
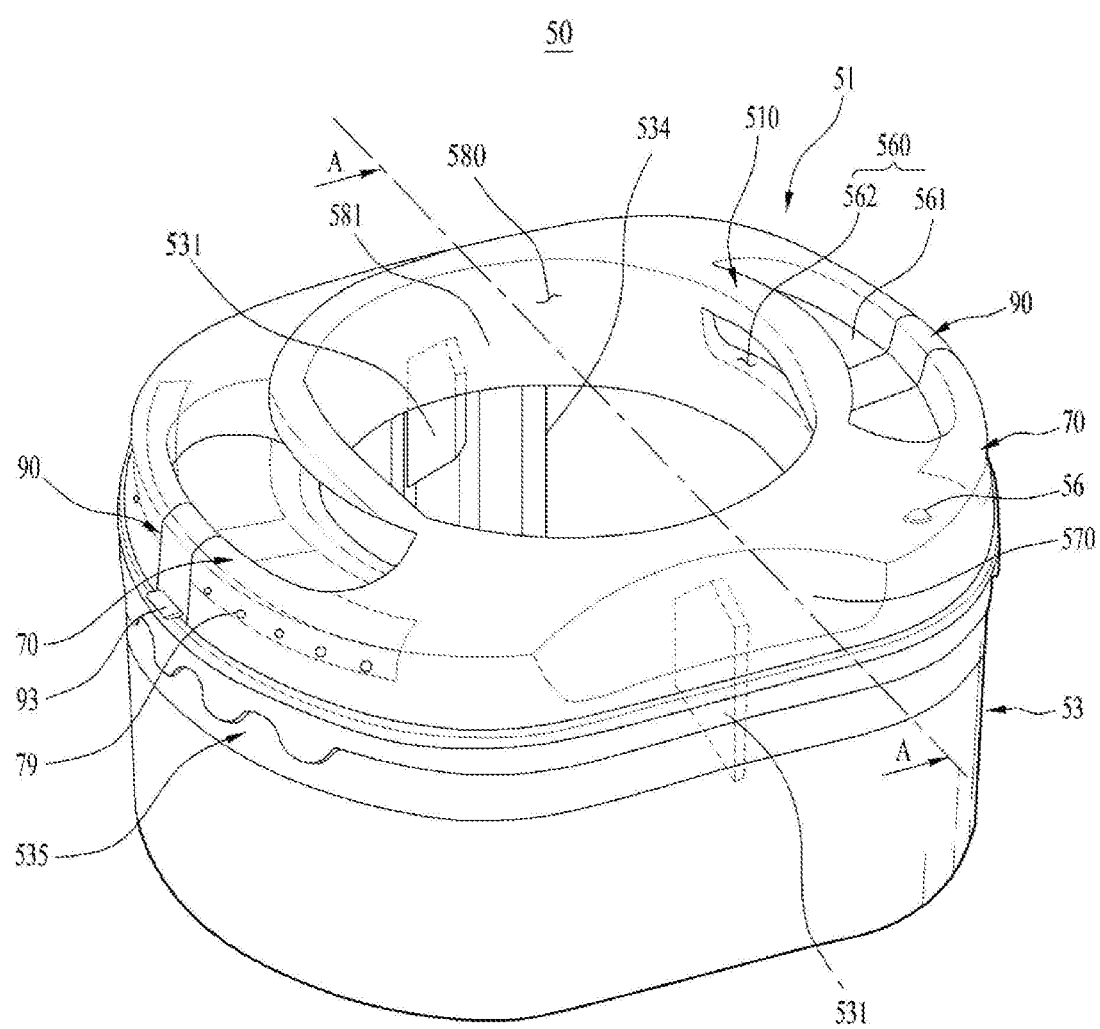
FIG. 2 is a perspective diagram illustrating a sub-drum which is shown in FIG. 1.

FIG. 2 is a perspective diagram illustrating the sub-drum 50 which is shown in FIG. 1. FIG. 3 is a sectional diagram along A-A line which is shown in FIG. 2. FIG. 4 is a plane view illustrating the sub-drum 50 mounted in the drum 30. FIG. 3 is an exploded perspective diagram of the sub-drum shown in FIG. 1. FIG. 4 is a sectional diagram along A-A line which is shown in FIG. 2. FIG. 5 is a plane view illustrating the sub-drum mounted in a drum.

Referring to FIGS. 2 through 5, the sub-drum 50 may be detachably mounted in an upper end area of the drum 30. The sub-drum 50 has a kind of a container shape with an open top. The laundry may be loaded or unloaded through the open top. Also, wash water may be supplied to the internal space of the sub-drum via the open tope and a cross section of the sub-drum may be formed in an approximately circular shape.

The sub-drum 50 may be configured to perform the washing, independent from the drum 30. After the laundry is sorted according to the color or fabric type and dividedly loaded into the drum 30 and the sub-drum 50 and washing is performed for the laundry supplied to the drum and the sub-drum simultaneously. Accordingly, the operation frequency of the laundry treating apparatus 1 may be reduced and the waste of the wash water, detergent and energy may be prevented at the same time. Also, the laundry may be sorted according to a contamination degree or the user's intended use of the laundry. As one example, laundry items such as lingerie or underwear may be dividedly washed from the laundry items which are used in cleaning such that the user's satisfaction level about the separated washing may be remarkably enhanced. In addition, the water supply and drainage may be separately performed and the separated washing effect may be substantially enhanced.

The sub-drum 50 may perform the washing while being rotated by the rotational force transmitted from the drum 30 such that no auxiliary drive device may be provided. That is because the sub-drum is integrally rotated together with the drum.

The sub-drum 50 includes a sub-drum body 53 formed in a cylinder shape with an open top; a sub-drum cover 51 detachably coupled to an upper end of the sub-drum body 53; an outlet unit 70 configured to exhaust the wash water held in the sub-drum 50 outside when the sub-drum 50 is rotated at a high speed; and a coupling unit 93 configured to couple and decouple the sub-drum 50 to and from the drum 30.

The sub-drum body 53 has an oval cross section so as to form a vortex in the wash water and a friction rib 534 may be provided in an inner circumferential surface of the sub-drum body 53 to form a water current in the wash water.

The top loading type laundry treating apparatus 1 in accordance with the embodiment may perform the washing process by using the chemical action of the detergent and the friction between the water currents formed by the rotation of the drum and the laundry. The sub-drum body 53 having the oval-shaped cross section may generate the vortex by using the rotation more efficiently than the drum having the circular-shaped cross section. As the vortex increases the friction between the wash water and the laundry, the sub drum 50 having the oval-shaped cross section may enhance the washing efficiency.

Figure 4:
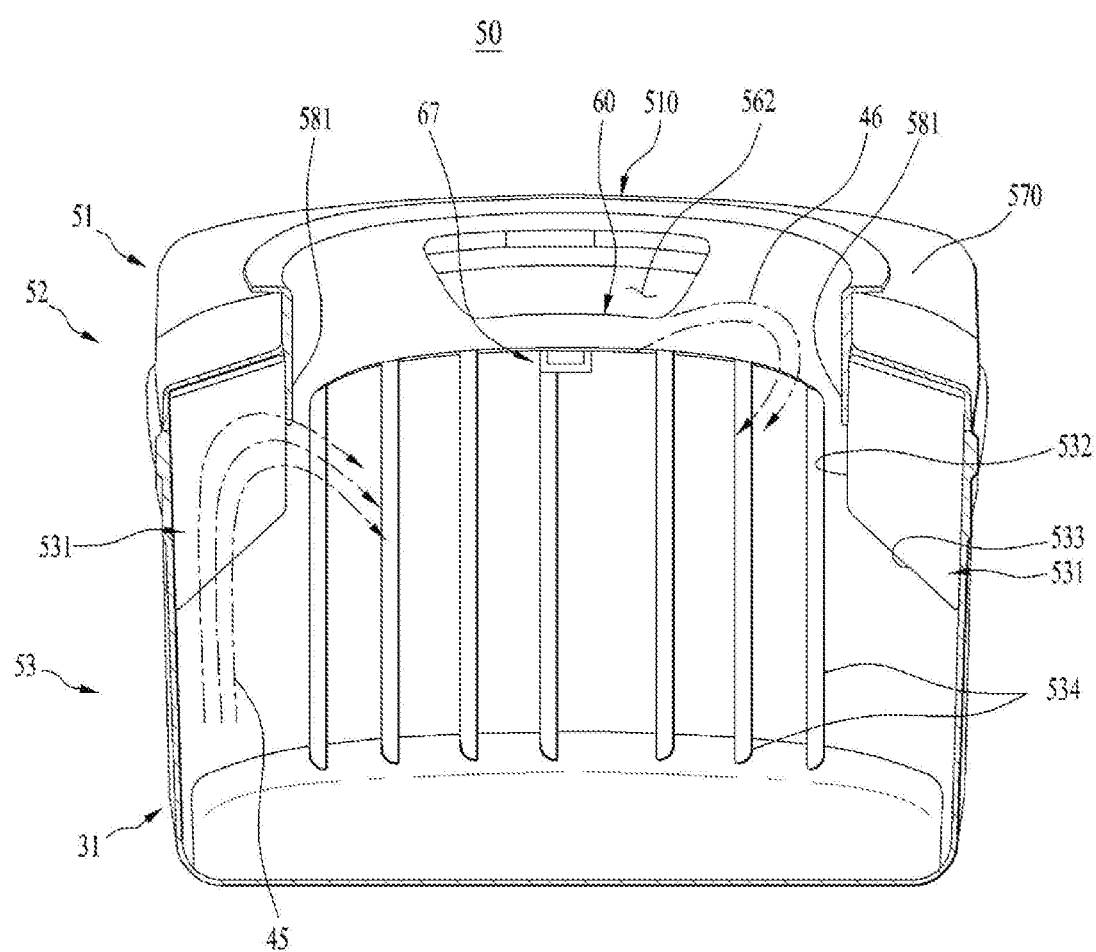
FIG. 4 is a sectional diagram along A-A line which is shown in FIG. 2.

Meanwhile, the sub-drum body 53 may include an inner circumferential surface formed with a first curvature area (C1) having a first curvature and a second curvature area (C2) having a second curvature which is smaller than the first curvature, as shown in FIG. 4.

A pair of first curvature areas (C1) may be formed in the areas of the sub-drum body 53 which face each other, respectively, and the first curvature is identical to the curvature of the inner circumferential surface of the opening formed in the drum cover 31.

A pair of second curvature areas (C2) may be formed in the opposite areas of the sub-drum body 53 which face each other, respectively, with being located between the first curvature areas (C1). The second curvature may be smaller than the first curvature.

In other words, the first curvature areas (C1) and the second curvature areas (C2) may be alternatively provided along a circumference of the cross sectional surface formed in the sub-drum body 53.

The inner circumferential surface of the sub-drum body 53 may be divided into a short distance area (C2) spaced a first distance apart from the rotational center of the sub-drum 50; and a long distance area (C1) spaced a second distance apart from the rotation center of the sub-drum 50, the second distance farther than the first distance. The long distance area (C1) corresponds to the first curvature area (C1) and the short distance area (C2) corresponds to the second curvature area (C2).

Meanwhile, a first water supply path 573 which will be described later may be formed as the short distance area (C2) is spaced a sufficient distance apart from the inner circumferential surface of the drum-cover 31.

It is described that some area of the inner circumferential surface which the second curvature area (C2) indicates is curved but the embodiments of the present disclosure are not limited thereto. The area of the inner circumferential surface may be plane. In this instance, it is more appropriate that the second curvature area (C2) is named the short distance area (C2).

The first curvature area (C1), the second curvature area (C2), the long distance area (C1), the short distance area (C2), a coupling area (C1) and a distant area (C2) indicate specific areas. All of the areas which belong to the above-noted specific areas may be referred to as the terms mentioned above. In the disclosure, some areas of the sub-drum body 53 and the sub-drum body 51 are referred to as the above-noted terms.

It is shown in FIGS. 4 and 5 that the cross sectional surface of the sub-drum 50 is oval with respect to the overall height. However, the embodiments are not limited thereto. As one example, one short distance area (C2) may be formed or the short distance area (C2) may be formed only in the sub-drum body 53. In other words, the overall shape of the sub-drum cover 51 is circular and only the sub-drum body 51 provided in the lower area of the sub-drum cover 51 to hold wash water may have the short distance area (C2). Such the short distance area may define some space that vertically penetrates the drum from the drum upper portion into the drum inside. Accordingly, it is possible to form a penetrating area (not shown) in the sub-drum cover 51, corresponding to the short distance area.

Accordingly, as mentioned above, it is not necessary to form the overall shape of the sub-drum 50 in the oval shape so as to supply the wash water to the inside of the drum by vertically dropping the wash water via the water supply unit 18, without passing through the sub-drum 50. Any shapes are possible only if the short distance area for allowing the wash water to vertically flow is formed in the sub-drum body 51. The control of the drum rotation angle may be performed to locate such the short distance area to a corresponding area to the water supply unit 18.

Meanwhile, the sub-drum body 53 may include no through-holes 33 formed in the circumferential surface, different from the drum 30 including the through-holes 33 formed in the circumferential surface. Accordingly, the sub-drum body 53 may hold the wash water and the laundry and the wash water may not be exhausted into the drum 30 via the circumferential surface or lower surface. The wash water held in the tub 20 is only drawn into the drum 30 via the through-holes 33, not into the sub-drum 50.

The friction rib 534 may be projected from the inner circumferential surface of the sub-drum body 53 vertically. A plurality of friction ribs 534 may be spaced a preset distance apart from each other and integrally formed with the sub-drum body 53. The friction ribs 534 may be rotated the wash water in the rotational direction of the sub-drum body 53 by the frictional force with the wash water during the rotation of the sub-drum body 53. The friction ribs 534 are different from guide ribs 531, which will be described later, in the shape and functions.

The sub-drum cover 51 is coupled to an upper end of the sub-drum body 53, having a cross sectional surface which is equal to the cross sectional surface of the sub-drum body 53.

Accordingly, the circumferential surface of the sub-drum cover 51 may be divided into a first curvature area (C1) and a second curvature area (C2). The first curvature area (C1) may be named a first long distance area (C1) and the second curvature area (C2) may be named a second short distance area (C2). Different from the first and second curvature areas (C1) and (C2) of the sub-drum body 53, the first curvature area (C1) of the sub-drum cover 51 is coupled to the inner circumferential surface of the drum cover 31 and named a distant area (C2). Also, the second curvature area (C2) is spaced apart from the inner circumferential surface of the drum cover 31 and then named the distant area (C2).

The sub-drum cover 51 may include a laundry introduction opening 580 formed in an upper surface to introduce the laundry; and a handle unit 510 which provides a predetermined space to be grabbed by the user.

In addition, the sub-drum cover 51 may include an inner water supply guide 560 configured to guide the wash water exhausted from the water supply unit 18 into the sub-drum 50; and an outer water supply guide 570 configured to guide the wash water exhausted from the water supply unit into the drum 30 along an outer surface of the sub-drum 50.

The inner water supply guide 560 may function to guide the wash water supplied via the water supply unit 18 into the sub-drum smoothly, not into the drum simultaneously.

The outer water supply guide 560 may function to guide the wash water supplied via the water supply unit 18 into the drum smoothly, not into the sub-drum simultaneously.

The sub-drum cover 51 includes a guide rib 531 provided to lift the wash water circulating along the inner circumferential surface of the sub-drum body 53 after the flow direction is changed by collision and fall to the center of the sub-drum body 53.

The handle unit 510 may be formed in an upper surface of the sub-drum cover 51 and include a pair of handle units 510 facing each other.

The handle unit 510 may be arranged adjacent to the first curvature area (C1), in other words, the long distance area (C1) of the sub-drum cover 51. When the wash water is one-sided by the shock applied when the user demount the sub-drum 50 from the drum 30, rolling might occur in a left-and-right direction while the sub-drum 50 is rotating on a virtual axis passing the pair of the long distance areas (C1). When the handle unit 510 is provided near the second curvature area (C2), in other words, the short distance area (C2), the user has to apply a strong force so as to steady the vertical vibration of the sub-drum 50 such that it may be more advantageous to locate the handle unit 510 near the long distance area (C1).

The inner water supply guide 560 is provided in an upper surface of the sub-drum cover 51, more specifically, the long distance area (C1), in other words, a coupling area (C1). The inner water supply guide 560 may include a concave area 561 and a water supply hole 562.

To form the concave area 561, some area is recessed from the upper surface of the sub-drum cover 51 not to spread the wash water exhausted from the water supply unit 18 around after being collided against the upper surface of the sub-drum cover 51.

The water supply hole 562 is formed in an inner surface of the concave area toward the laundry introduction opening 580 to communicate the concave area 561 with the laundry introduction opening 580. Accordingly, as the wash water is guided to the laundry introduction opening 580 via the water supply hole 562 from the concave area 561, the water supply hole 562 may form a second water supply path 562 to guide the wash water to the sub-drum 50.

The wash water exhausted from the water supply unit 18 is temporarily stored in the concave area 561 such that the wash water may not be spread around the sub-drum cover 51 and then exhausted to the laundry introduction opening 580 via the water supply hole 562, in other words, the second water supply path 562 to be guided into the sub-drum 50.

Meanwhile, the concave area 561 and the water supply hole 562 may be formed in a lower area of the handle units 510 such that the spatial efficiency of the sub-drum cover 51 can be maximized The outer water supply guide 570 may be provided in the sub-drum cover 51, preferably, the short distance area (C2), in other words, the distant area (C2). More specifically, the outer water supply guide 570 may be spaced apart from the inner water supply guide 560. The sub-drum 50 may be rotated a preset angle together with the drum 30, to locate the inner water supply guide 560 and the outer water supply guide 570 under one water supply unit 18. Accordingly, even when the outer water supply guide 570 is separated from the inner water supply guide 560, the wash water exhausted from one water supply unit 18 may be supplied to the drum 30 and the sub-drum 50, respectively.

The outer water supply guide 570 is formed by recessing a corner of the distance area (C2) into the sub-drum cover 51 and a bottom surface is inclined outwards and downwards with respect to the sub-drum cover 51. The wash water exhausted from the water supply unit 18 may be guided into the drum 30 along the first water supply path 573 defined as the space formed between the distant area (C2) and the outer circumferential surface of the drum 30.

The guide rib 531 may be formed in a plate shape and provided under the upper surface of the sub-drum cover 51, being extended downwards. The guide rib 531 has one surface contacting with the inner circumferential surface of the sub-drum body 53. More specifically, the plate-shaped guide rib 531 has the top coupled to the sub-drum cover and one side surface in contact with the inner circumferential surface of the sub-drum body 53. Accordingly, the wash water held in the sub-drum body 53 is rotated along the inner circumferential surface of the sub-drum body 53 by the rotational force of the sub-drum 50 and the flow direction of the wash water is changed by the collision with the guide rib 531 to flow upwards and fall down to the center of the sub-drum 50 in an arc.

More specifically, the guide rib 531 may be formed in one surface toward the side surface toward the center of the sub-drum body 53. The guide rib 531 may include a rib vertical area 532 downwardly extended from the upper surface of the sub-drum cover 51; and a rib inclined area 533 formed in a lower surface toward the bottom of the sub-drum body 53, downwardly extended from the rib vertical area and the center of the sub-drum 50 toward the inner circumferential surface.

The rib inclined area 533 is spaced apart from the lower surface of the sub-drum body 53, while forming an acute angle with the inner circumferential surface of the sub-drum 50.

As the rib inclined area 533 is formed in the lower surface of the guide rib 531, the laundry rotated and flowing in the inside of the sub-drum body 53, together with the wash water, may be less interfered with. Accordingly, the flow of the laundry may be performed more efficiently and the friction between the laundry items may be increased enough to enhance the washing efficiency or performance.

Meanwhile, even if the rib inclined area 533 is formed in the guide rib 531, a sufficient amount of wash water can be lifted. For example, when the sub-drum 50 is rotated at a high speed, a water level of the wash water held in the inner circumferential surface of the sub-drum body 53 is higher than a water level of the wash water held in the center of the sub-drum body 53. Accordingly, even if the rib inclined area 533 is formed in the guide rib 531, sufficient wash water can be collided with the guide rib 531 to be lifted.

Meanwhile, when the sub-drum 50 is rotated at a relatively low speed, the guide rib 531 may be arranged in the short distance area (C2) of the sub-drum cover 51 to lift a sufficient amount of wash water. The amount of the wash water passing through a virtual section from the center of the sub-drum body 53 to the short distance area (C2) is equal to the amount of the wash water passing through a virtual section from the center of the sub-drum body 53 to the long distance area (C1). Accordingly, the water level of the wash water when passing through the virtual section to the short distance area (C2) from the center of the sub-drum body 53 is higher than the water level of the wash water when passing through the virtual section to the long distance area (C1) such that the guide rib 531 can lift the sufficient amount of the wash water even when the sub-drum 50 is rotated at the low speed.

The guide rib 531 has one surface configured to collide with the wash water and the other opposite surface, which are upwardly inclined toward the flow direction of the wash water. In other words, when viewing the guide rib 531 from the center of the sub-drum body 53 in a radial direction, the width of the lower cross section may be larger than the width of the upper cross section. Accordingly, the wash water may be lifted along the one surface and the other surface of the guide rib 531 more efficiently.

Figure 3:
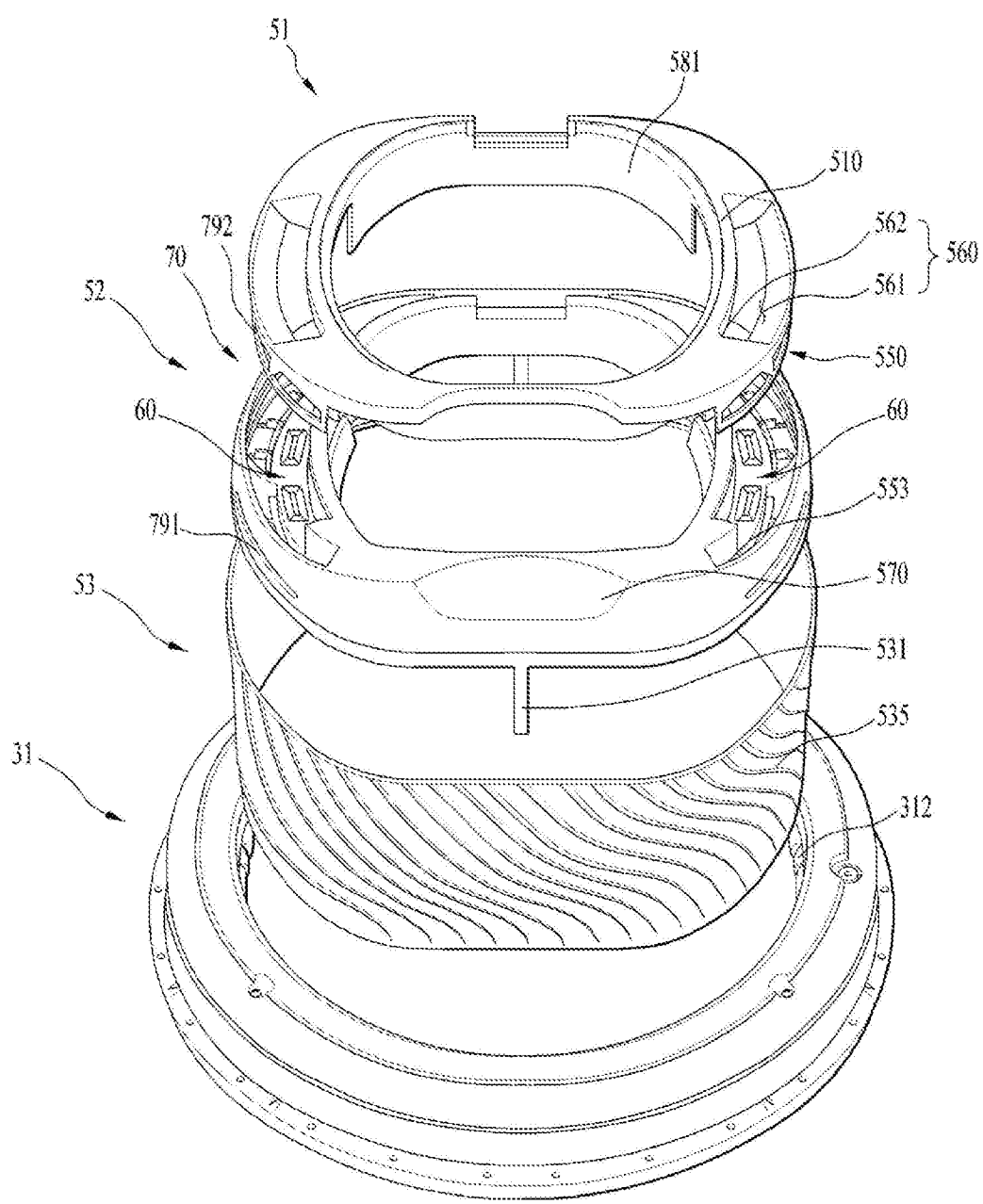
FIG. 3 is an exploded perspective diagram of the sub-drum shown in FIG. 1.

By experiments, it is shown in FIG. 3 that the high washing efficiency is generated together with an inclined guide, when the horizontal length and the height of the sub-drum 50 is 399 mm and 309.2 mm and the height (H) and the width (W) of the guide rib 531 are 70 mm and 65 mm. When the experiment is performed in a state the height (H) of the guide rib 531 is set as 50 mm and 90 mm with the other values are the same, more enhanced washing performance is gained for some contaminants but an average of the values is lower than an average when the height (H) of the guide rib 531 is set as 70 mm meanwhile, such the values are just one example gained by the experiments and specific values of the sub-drum 50 and the guide rib 531 are not limited thereto.

The pair of the guide ribs 531 is provided in the short distance area (C2), respectively, as mentioned above, and the embodiments are not limited thereto. More guide ribs 531 are provided in the long distance area (C1) to be two pairs.

The incline guide 581 may be provided above the guide rib 531 and downwardly inclined to the inside of the sub-drum 50. More specifically, the inclined guide 581 is formed along an inner area, in other words, an inner circumferential surface of the laundry introduction opening 580 provided above the guide rib 531.

Without the inclined guide 581, the wash water lifted by the guide rib 531 flows to an upper area of the inner circumferential surface of the sub-drum body 53 and then a lower area of the upper surface toward the center of the sub-drum body 53. After that, the wash water falls into the sub-drum body 53 freely, while drawing an arc.

When the inclined guide 581 is installed, the wash water will not fall freely. In other words, the wash water horizontally flowing along the lower area of the upper surface of the sub-drum cover 51 may form the flow 45 of which a direction is drastically changed downwards by the lower surface of the inclined guide 581. More specifically, the horizontal component speed is partially changed into the vertical component speed. The wash water of which the flow direction is drastically changed is collided against the laundry loaded in the sub-drum body 53 more strongly than the wash water falling down freely. At this time, the inclination angle ($\theta$) of the inclined guide 581 may be set as approximately 10 degrees with respect to the direction of gravity. The angle at which the flow direction of the wash water is changed may be set larger. Accordingly, a stronger shock may be applied to the laundry loaded in the sub-drum body to enhance the washing performance.

It is described that the inclination angle ($\theta$) is approximately 10 degrees and such the value is one of examples, not limited thereto.

Meanwhile, when the sub-drum 50 is rotated at a high speed, the wash water held in the sub-drum 50 could collide with each other to splash to the laundry introduction opening 580. At this time, the inclined guide 581 is configured to guide the splashed wash water into the sub-drum 50 along the upper surface so as to form the flow 46 to the sub-drum 50.

The sub-drum 50 has a second uneven area 535 formed in an outer circumferential surface to be seated on an inner circumferential surface of a balancer 311 while engaging with a first uneven area 315 formed in the balancer 311. Such the second uneven area 535 may be formed in the coupling area (C1) of the outer circumferential surface of the sub-drum body 53. It is preferred that the second uneven area 535 is not formed in the outer circumferential surface of the sub-drum cover 51. The wash water held in the sub-drum body 53 and the weight of the laundry might separate the sub-drum cover 51 from the sub-drum body 53.

The first uneven area 312 is projected from the inner circumferential surface of the drum cover 31. In addition, projections are upwardly projected from an upper end of the first uneven area 312. The first uneven area 312 is formed over the circumference of the inner circumferential surface of the drum cover 31.

The second uneven area 535 is projected from the outer circumferential surface of the sub-drum. The outer circumferential surface of the sub-drum is divided into a short distance area C2 and a long distance area C1. The long distance area may be coupled to the inner circumferential surface of the drum cover such that the second uneven area 535 may be formed in the long distance area. Projections are continuously and downwardly projected from a lower end of the second uneven area 535. The projections of the second uneven area 535 are configured to engage with the projections of the first uneven area 312.

Accordingly, the rotational force of the drum 30 may be transferred to the sub-drum 50 and the sub-drum 50 may be also rotated together with the drum 30. Meanwhile, the sub-drum 50 includes a discharging area 70 for discharging the water from the sub-drum 50 while the sub-drum 50 is rotated at a high rotation number. The discharging area 70 is projected adjacent to a first curvature C1, in other words, the long distance area C1 and performs a function of selectively discharging the wash water held in the sub-drum 50 outside by the size of the centrifugal force generated during the rotation of the sub-drum 50.

As described above, the washing process performed by the sub-drum 50 is independently separated from the washing process performed by the drum 30. For that, water supply to the drum 30 has to be separated from water supply to the sub-drum 50. Moreover, the wash water supplied to the sub-drum 50 has to be held in the sub-drum 50 prevent the water from flowing into the drum 30 and the water has to be discharged from the sub-drum 50 in a drainage process and a dry-spinning process.

In other words, the sub-drum 50 has to hold wash water when rotated at a washing rpm to perform the washing and discharge the water when rotated at a dry-spinning rpm which is higher than the washing rpm.

At this time, the discharging area 70 is configured to discharge the water outside only when the centrifugal force generated by the rotation of the sub-drum 50 at the dry-spinning rpm higher than the washing rpm.

The discharging area 70 has a chamber (not shown) which accommodates water; an inlet hole (not shown) provided to draw water; and an outlet hole 79 provided to discharge the water from the chamber.

The discharging area 70 may be spaced a preset distance from a lateral wall of the sub-drum 50 in an inner radial direction, while the inlet hole is provided in a bottom surface of the chamber. Accordingly, the entire area of the inlet hole is smaller than the area of the chamber bottom surface with which the water is collided and a first resistance is generated when the water is drawn via the inlet hole. After that, a second resistance is additionally generated to raise the water against the centrifugal force, after flowing outside with respect to a radial direction.

Moreover, the discharging area 70 has the outlet hole 791 provided above the inlet hole and penetrating the lateral wall of the sub-drum 50. Accordingly, when water is drawn into the chamber via the inlet hole, a third resistance is additionally generated to flow outside the radial direction of the sub-drum 50 and then to raise the water against the gravity.

Accordingly, when the sub-drum 50 is rotated at the washing rpm which is lower than the dry-spinning rpm, the wash water may not be discharged from the sub-drum 50. In other words, the wash water is set to be selectively discharged only when the sub-drum 50 is rotated at preset dry-spinning rpm. Of course, such selective discharging may be facilitated even without the configurations including a drainage valve or a drainage pump provided as control objects.

Meanwhile, the sub-drum 50 may include a body 53 configured to water and laundry; and a sub-cover coupled to an upper surface of the body 53 and having a laundry introduction opening 515 for loading the laundry.

In this instance, the second uneven area 535 is provided in an outer circumferential surface of the body 53 so as to prevent the sub-cover from being separated from the body 53 by the weight of the water and laundry loaded in the body 53. In addition, the discharging area 70, the guide rib 531, the handle unit 510, the inner water supply guide 560 and the outer water supply guide 570 may be also provided in the sub-cover.

Meanwhile, the sub-cover may be integrally formed as one body. Alternatively, as shown in FIG. 3, the sub-cover may include a lower cover 52 coupled to the upper end of the body 53; and an upper cover 51 coupled to a top of the lower cover 52.

The chamber (not shown) of the discharging area 70 is defined by the coupling between the lower cover 52 and the upper cover 51. In this instance, the inlet hole is provided in the lower cover 52. The outlet hole 79 may include a first outlet hole 791 provided in an upper end of the lower cover 52; and a second outlet hole 792 provided in an upper end of the upper cover 51. Accordingly, after water is drawn into the chamber via the inlet hole, the water is discharged via the outlet hole 79 configured of the second outlet hole 792 and the first outlet hole 791.

The concave area 561 forming the inner water supply guide 560 may be defined by the coupling between the lower cover 52 and the upper cover 51. An upper surface of the lower cover 52 may form a bottom surface of the concave area 561 and some inserted area of the upper cover 51 may form an inclined surface of the concave area 561. The water supply hole 562 forming the inner water supply guide 560 may be defined by the space distance from the handle unit 510 and the upper surface of the lower cover 52.

Meanwhile, a control method of the laundry treating apparatus 1 in accordance with one embodiment may determine whether the sub-drum 50 is mounted in the drum 30 before starting the washing or performing the water supply for the washing. Also, the control method may determine whether the sub-drum is mounted normally and it may be performed by using the first sensor unit 54.

In this instance, the control unit 100 performs preset determination processes based on the sensing signal transmitted from the first sensor unit 54 and the second sensor unit 25 or the sensing signal transmitted from the first sensor unit 54 and the output currents detected while predetermined frequency currents are flowing to the motor and control the water supply unit 18, the motor 14 and the brake unit 110 based on the result of the determination processes. The sensing signal transmitted from the second sensor unit 25 and the output currents detected while the preset frequency currents are flowing to the motor are used when the control unit 100 measures the rotation angle of the drum 30. Hereinafter, for easy and convenient description, the second sensor unit 25 is exemplified as the element configured to sense the rotation angle of the drum. Detailed description about the relation between the elements for the water supply will be omitted.

Meanwhile, the embodiment for the location control of the drum 30 and the sub-drum 50 to supply wash water is described. However, the location control of the drum 50 and the sub-drum 50 for the location control of the handle units 510 may be performed.

The user is able to separate the sub-drum 50 from the drum 30 while holding the handle units 510. Accordingly, it is preferred that the handle units 510 are determined to allow the user to easily grab the handle units 510 from the surface of the laundry treating apparatus. The location control of the drum 30 may be performed to locate the handle units 510 at a desired position.

More specifically, the location control of the sub-drum 50 may be performed at a place where the sub-drum 50 is decoupled. As one example, the location control may be performed to pause or end the washing course.

When the sub-drum 50 is mounted in the drum 30 only at a specific location, the location control of the drum may be performed for an easy coupling process. As one example, the location control may be performed to pause the washing without the sub-drum 50 or start and end the washing without the sub-drum 50.

In other words, the rotation location control of the drum and/or sub-drum 50 (the stopping of the drum and/or sub-drum 50 at a preset location) may be performed for the water supply and for easy and convenient mounting and/or demounting of the sub-drum.

Meanwhile, the laundry treating apparatus may be configured to perform one or more washing courses and include an auxiliary control panel configured to allow the user to select the washing courses. The control panel may include an input unit configured to receive diverse washing course inputs and a display unit configured to display the input washing courses.

On such the control panel may be provided the washing courses for the laundry loaded in the drum and no washing courses for the laundry loaded in the sub-drum 50. In this instance, once the sub-drum 50 is mounted, the laundry treating apparatus 1 may determine and implement a corresponding washing course to the sub-drum 50 out of the preset washing courses.

Accordingly, when trying to use the sub-drum 50 after mounting the sub-drum 50 in the conventional laundry treating apparatus 1 having no sub-drum 50, the user is able to use the control panel of the conventional laundry treating apparatus without change or fixing.

Figure 7:
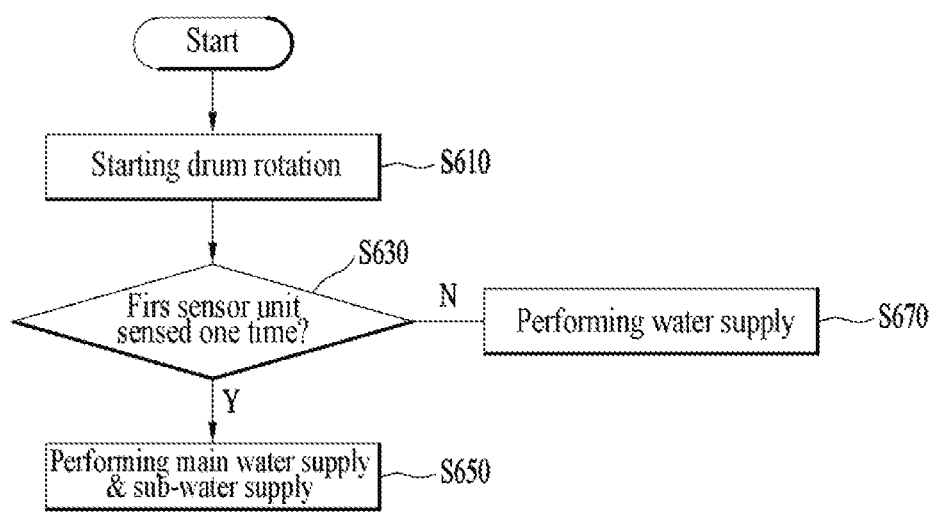
FIG. 7 is a flow chart illustrating a step for determining whether the sub-drum is mounted in the drum.

Referring to FIG. 7, the control method in accordance with one embodiment will be described in detail.

It has to be determined whether the washing course is performed only in the drum 30 or the sub-drum 50. For that, the drum is rotated (S610) and the drum is rotated to determine whether the sub-drum 50 is mounted or whether the sub-drum 50 is normally mounted. It can be said that such determination is performed to determine whether to supply wash water only to the drum 30 or both of the drum 30 and the sub-drum 50.

More specifically, the control unit 100 is implemented to control the drive unit 14 to rotate the drum 30. When the drum 30 is rotated, the second sensor unit 25 senses the rotation angle of the drum 30 and transmits a signal to the control unit 100.

Meanwhile, when a normal signal is not received from the first sensor unit, it may be determined that the sub-drum is not mounted or that the sub-drum is mounted abnormally. As one example, when receiving no signal from the first sensor unit 54 while the second sensor unit 24 senses that the rotation angle of the drum 30 is 360 degrees, the control unit 100 may determine that the sub-drum 50 is not mounted in the drum 30 (S630-N).

When determining that the sub-drum 50 is not mounted in the drum 30, the control unit 100 is implemented to control the water supply unit 18 to supply wash water to the drum 30 (S670). In this instance, the location control of the drum for the water supply may not be performed. In other words, the control unit 100 may not control the drive unit 18 and the brake unit 110 to locate the outer water supply guide 570 or the inner water supply guide 560 under the water supply unit.

When it is determined that the sub-drum 50 is mounted abnormally, an alarm may be provided.

Meanwhile, when a normal signal is received from the first sensor unit, it may be determined that the sub-drum is mounted normally. As one example, when receiving the signal from the first sensor unit 54 while the second sensor unit 25 senses that the rotation angle of the drum 30 is 360 degrees, the control unit 100 may determine that the sub-drum 50 is mounted in the drum 30 (S630-Y).

Once determining that the sub-drum 50 is mounted in the drum 30 normally, the control unit 100 is implemented to perform the location control of the sub-drum 50 so as to supply wash water.

As one example, the control unit performs a main water supply to the drum 30 by locating the outer water supply guide 570 under the water supply unit 18. The control unit 100 may perform a sub-water supply configured to rotate the sub-drum 50 a preset angle and then locate the main water supply and the inner water supply guide 560 under the water supply unit 18 (S650). Of course, the main-water supply may be performed after the sub-water supply.

Once the water supply starts, wash water is exhausted via the water supply unit 18. The exhausted wash water is supplied to the sub-drum 50 via the water supply guide 560 and to the drum 30, in other words, the tub 20 via the outer water supply guide 570. In other words, the water supply is performed after the angle control is performed configured to locate the inner water supply guide 560 and the outer water supply guide 570 under the water supply unit 18 by rotating the sub-drum 50.

For example, the control unit 100 may control the drive unit 14 to rotate the sub-drum 50 at a low rpm for the water supply. In this instance, the rpm is set as '3'. When the first sensor unit 54 transmits a sensing signal to the control unit 100, the control unit 100 may rotate the sub-drum 50 a preset angle from the moment when the first sensor unit 54 sends the sensing signal and locate the outer water supply guide 570 under the water supply unit 18. Such the rotation angle is preset according to the arrangement relation among the first sensor unit 54, the outer water supply guide 570 and the water supply unit 18.

The rotation angle of the sub-drum 50 is measured by the second sensor unit 25 and transmitted to the control unit 100, while the sub-drum 50 is rotated at a very low rpm. The control unit 100 controls the brake unit 110 to stop the sub-drum once determining that the measured rotation angle reaches a preset rotation angle.

As the rpm of the sub-drum 50 is very low, the distance of the sliding sub-drum 50 from the point when the brake unit 110 starts is so small to be ignored. When the sub-drum 50 is stopped by the brake unit 110, the outer water supply guide 570 is almost located under the water supply unit 18. Accordingly, the wash water exhausted from the water supply unit 18 may be supplied to the drum 50 via the outer water supply guide 570, without correcting the location of the sub-drum 50.

Meanwhile, as the rpm of the sub-drum 50 is very low, the control unit 100 may cut off the currents flowing to the drive unit from the point or in a preset time period when the first sensor unit 54 senses the location of the sub-drum 50. At this time, the sub-drum 50 may be by the inertia. However, the angle of the rotation caused by the inertia at the low rpm may be so small to be ignored or expected from the current cut-off point. The stopping location of the sub-drum may be expected at the current cut-off point based on the rpm and the location of the sub-drum at the sensing point of the first sensor unit. The location control of the sub-drum 50 may become simpler on the assumption that there is no big error of the expected location.

The braking caused by the rotation of the sub-drum 50 to supply wash water via the inner water supply guide 560 is equal to the braking caused by the rotation of the sub-drum 50 to supply wash water via the outer water supply guide 570 mentioned above, such that detailed description thereof can be omitted.

Meanwhile, as another example for the precise location control of the sub-drum 50, the control unit 100 may control the drive unit 14 to slidingly move the sub-drum 50 from the point when the brake is applied to the sub-drum by raising the rpm of the sub-drum 50. In this instance, the rpm may be set as '15~25' and the embodiments are not limited thereto.

In this embodiment, the rotation angle to locate the outer water supply guide 570 under the water supply unit 18 when the first sensor unit 54 transmits a sensing signal may be also preset according to the arrangement relation among the first sensor unit 54, the outer water supply guide 570 and the water supply unit 18. However, in the preset rotation angle of this embodiment may be set to be the same value with the preset rotation angle in the above-noted embodiment. Considering the sliding distance of the sub-drum, the preset rotation angle of this embodiment may be smaller than that of the above-noted embodiment.

Similar to the above-noted embodiment, the rotation angle of the sub-drum 50 is measured during the rotation of the sub-drum and the measured values may be transmitted to the control unit 100. Once determining that the measured rotation angle reaches a preset rotation angle, the control unit 100 controls the brake unit 110 to stop the sub-drum 50.

The sub-drum 50 has variable sliding angles at which the sub-drum 50 is sliding from the brake start point by the wash water held therein and the weight of the laundry. Especially, when the rpm is relatively high, such a sliding angle may be diversified. When the second sensor unit 25 measures the sliding angle of the sub-drum 50 and transmits the measured angle to the control unit 100, the control unit 100 corrects the preset rotation angle. For example, the control unit corrects the preset rotation angle to be smaller when the sliding angle of the sub-drum 50 is large enough for the outer water supply guide 570 to pass by the lower area of the water supply unit 18. In vice versa, the control unit 100 corrects the preset rotation angle value to be larger. At this time, the rpm is 15-25 rpm which are higher than 3 rpm and lower than 40-49 rpm in the conventional washing such that little load may be applied to the drive unit 14. Accordingly, the overload of the drive unit may be prevented and the precise location control of the sub-drum may be facilitated. In other words, after the correcting process is performed to prevent a deviation or an error, the location control of the sub-drum is performed and the precise location control of the sub-drum may be then performed.

Meanwhile, after water is supplied to the drum 30 and the sub-drum 50, the drive unit 14 is implemented to rotate the drum 30 and the sub-drum 50 and perform the washing process.

In case of washing the laundry loaded in the drum 30, washing may be performed through diverse drum drive motions. According to one embodiment of the present disclosure, a basket motion and a pulsator motion may be implemented to wash the laundry loaded in the drum 30. The basket motion is one motion implemented to rotate only the drum and the pulsator motion is one motion implemented to rotate only the pulsator so as to form water currents in the drum. Accordingly, the washing may be substantially performed in the pulsator motion. Of course, the washing may be performed even in combination of diverse motions as well as such the motions.

Control factors including a combination pattern of motions, a duration of a motion and RPM may be set different according to the selected course. Such control factors may be changed based on information about not only the course but also the options selected by the user. As one example, control factors in the substantially performed course may be changed according to option information such as a contamination level, a water temperature, a dry-spinning RPM, a rinsing frequency and a wash water level.

Accordingly, control factors for washing may be selectable by the user and the selection may be facilitated through diverse user interfaces that are provided in the control panel. The user interfaces may be configured to perform the washing for the drum 30.

However, when the sub-drum 50 is mounted in the drum 30 to perform washing, it is preferred that diverse washing courses are provided to perform washing for the sub-drum 50. As one example, a special course for lingerie or delicate clothing needs to be performed in the sub-drum 50 or another special course for cleaning tools with severe contamination needs to be performed in the sub-drum 50.

In the basket motion, the drum is rotated and thus the sub-drum 50 is also integrally rotated with the drum. Accordingly, it is possible to realize a plurality of courses for the sub-drum 50 by changing the duration or RPM of the basket motion.

In other words, it is possible to perform a specific course for the sub-drum simultaneously or combinedly together with a specific course for the drum. However, in this instance, it is not easy to further provide an auxiliary user interface in the control panel to select a course for the sub-drum or a corresponding option to the selected course.

Hereinafter, referring to FIGS. 8 through 11, one embodiment of the discharging area 70 will be described in detail.

Figure 8:
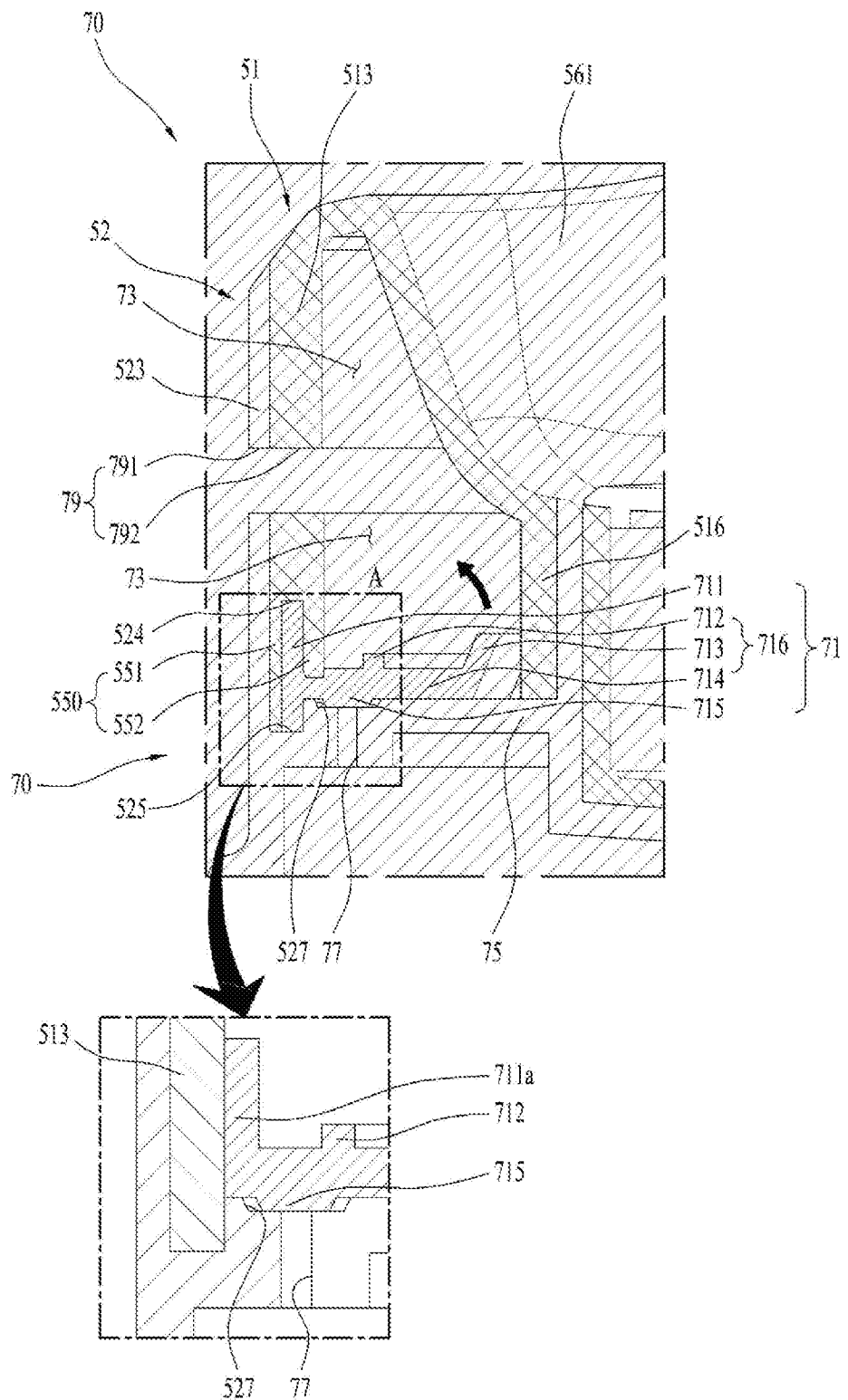
FIG. 8 is a side sectional diagram illustrating a sub-drum discharging area in accordance with one embodiment.
Figure 9:
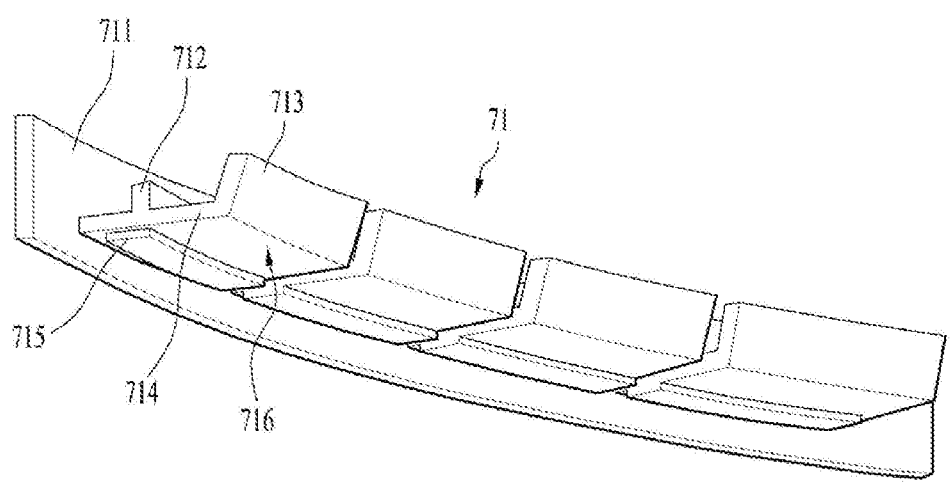
FIG. 9 is a lower perspective diagram illustrating a check valve of the discharging area shown in FIG. 8.
Figure 10:
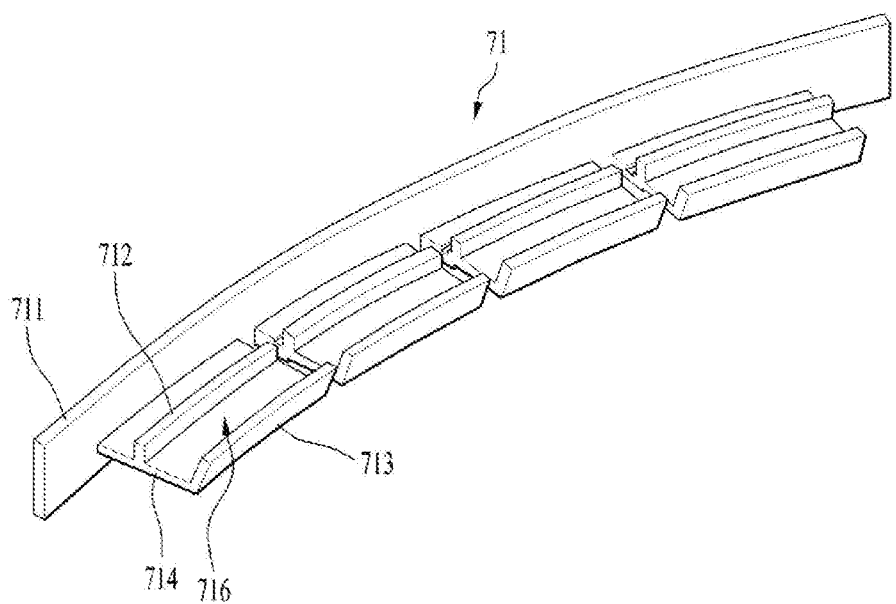
FIG. 10 is an upper perspective diagram illustrating a check valve of the discharging area shown in FIG. 8.
Figure 11:
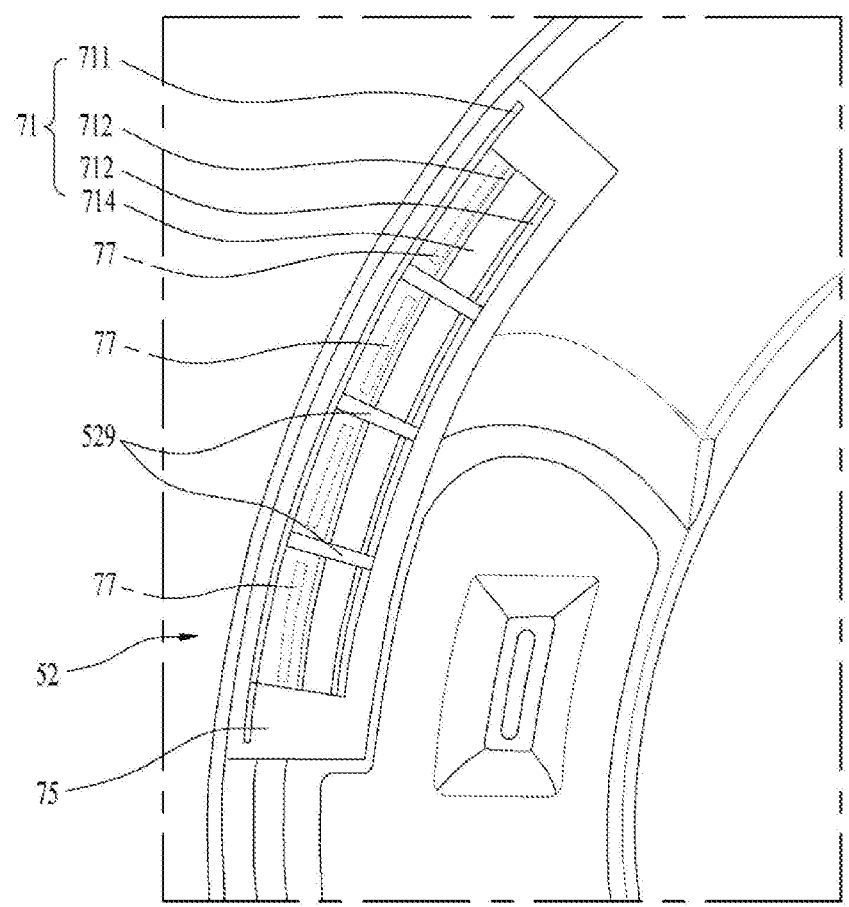
FIG. 11 is a plane view to describe a state where the check valve is mounted in the discharging area shown in FIG. 8.

FIG. 8 is a side sectional diagram illustrating the discharging area 70 in accordance with one embodiment. FIG. 9 is a lower perspective diagram illustrating a check valve 71 of the discharging area shown in FIG. 8. FIG. 10 is an upper perspective diagram illustrating the check valve 71 of the discharging area shown in FIG. 8. FIG. 11 is a plane view to describe a state where the check valve 71 is mounted in the discharging area shown in FIG. 8.

Referring to FIG. 8, the discharging area 70 may include a chamber 73 for defining a space for accommodating wash water; an inlet hole 77 provided to draw the wash water into the chamber 73; and an outlet hole 79 provided to discharge the wash water from the chamber 73.

The chamber 73 provides the space for accommodating the wash water and it is provided in an edge of the upper end of the sub-drum 50. The chamber 73 has to be higher than the wash water held in the sub-drum 50, because the wash water is sided to an inner circumferential edge or surface of the sub-drum 50 by the centrifugal force.

The inlet hole 77 may be provided in a lower surface of the chamber 73 to draw the wash water from the sub-drum 50. Accordingly, the entire area of the inlet hole 77 is smaller than the area of the lower surface of the chamber 73 where the wash water is collided. When the wash water is drawn through the inlet hole 77, resistance is generated.

The outlet hole 79 may be formed in an outer area with respect to a radial direction, compared with the inlet hole 77. As the sub-drum is rotated, the flow of the wash water may be generated from the inlet hole 77 towards the outlet hole 79, in other words, towards the outer area with respect to the radial direction by the centrifugal force.

The outlet hole 79 may be formed higher than the inlet hole 77. If the flow of the wash water is blocked towards the outer area with respect to the radial direction caused by the centrifugal force of the rotating sub-drum, upward flow of wash water is likely to occur.

Accordingly, wash water flow resistance may be generated in consideration of a location relation between the outlet hole 79 and the inlet hole 77. In other words, water drainage may not be performed by the flow resistance of wash water at a low RPM which requires no drainage and the drainage may be performed against the wash water flow resistance only at a high RPM which requires the drainage.

The chamber 73 formed between the outlet hole 79 and the inlet hole 77 may be an expanded space. In other words, the chamber may be the space where the water flow is buffering. Such the buffering space may prevent continuous flow of the wash water. In other words, if the wash water is drawn into the chamber even at the low RPM, the expanded space is able to minimize the wash water drained via the outlet hole 79.

Meanwhile, the inlet hole 77 may be provided in contact with the lateral wall of the sub-drum 50 or spaced a preset distance apart from the lateral wall towards the inner area with respect to the radial direction. When the inlet hole 77 is spaced apart from the lateral wall of the sub-drum towards the inner area with respect to the radial direction, an additional resistance for raising after moving the wash water towards the outer area with respect to the radial direction due to the centrifugal force of the rotating sub-drum 50 may be generated against the centrifugal force to move towards the inner area with respect to the radial direction. In this instance, the preset distance may be determined based on diverse elements including the capacity, shape, diameter and depth of the sub-drum 50.

Accordingly, the location of the inlet hole 77 may prevent the wash water from being discharged via the discharging area 70 from the sub-drum 50 at a relatively low RPM at which the washing is performed.

The discharging area 70 may be provided in an upper end of the chamber 73, more specifically, through the lateral wall of the sub-drum 50. Once wash water is drawn into the chamber 73 via the inlet hole 77, the resistance may be additionally generated to move the wash water towards the outer area with respect to the radial direction of the sub-drum 50 and then raise the wash water against the gravity.

If the amount of the wash water discharged from the chamber 73 is larger than that of the wash water drawn into the chamber 73, the chamber 73 may have the same amount of wash water with the amount of the discharged wash water drawn therein while maintaining a state of being filled with the wash water. Accordingly, even in this instance, a resistance may be additionally generated to allow only some of the wash water to pass through the inlet hole 77 even if much wash water gets collected in the inlet hole 77.

Meanwhile, the outlet hole 79 may be formed in a shape of a slit longitudinally extended in a circumferential direction of the sub-drum 50. When the outlet hole 79 is formed in such a slit shape, more wash water than the wash water discharged via the circular outlet hole 79 when rising along the inner surface of the sub-drum 50 may be discharged via the outlet hole 79. Accordingly, compared with the circular-shaped outlet hole 79, the slit-shaped outlet hole may facilitate the water discharging smoothly and allow less wash water to remain in the chamber 73.

Accordingly, when the sub-drum 50 is rotated at a washing RPM that is lower than a dry-spinning RPM, the wash water will not be discharged from the sub-drum 50. In other words, only when the sub-drum 50 is rotated only in a preset dry-spinning RPM band, the wash water is selectively discharged. Even without the configurations provided as control objects such as a drainage valve or a drainage pump, such selective discharging may be facilitated. In other words, the structural characteristics of the discharging area may facilitate such the selective discharging or drainage.

Meanwhile, the discharging area 70 may further include a check valve 71 configured to selectively shut off the flow of the wash water discharged via the discharging area 70 according to the size of the centrifugal force. If the check valve 71 shuts off the discharging area 70, the wash water may not be discharged via the discharging area. If the check valve 71 opens the discharging area, the wash water may be discharged via the discharging area.

The discharging area 70 includes the inlet hole 77 configured to draw wash water from the sub-drum 50; and the outlet hole 79 configured to discharge the wash water drawn via the inlet hole 77 outside the sub-drum 50. A path having a uniform diameter may be formed between the inlet hole and the outlet hole. However, it is not easy to discharge much wash water. Accordingly, it is preferred to form a chamber 73 which is larger than the cross sectional areas of the inlet and outlet holes. In this instance, the inlet hole 77 may be a path provided to drawn wash water into the chamber and the outlet hole may be a path provided to discharge the wash water from the chamber.

The discharging area 70 may be open and closed by using at least one of the inlet and outlet holes. In other words, the check valve may be provided in at least one of the inlet and outlet holes.

However, the check valve may be provided to open and close the inlet hole, in case of the outlet hole having the chamber. That is to minimize the wash water residual in the chamber.

If the check valve closes the outlet hole, the wash water might fail to be discharged with completion of the dry-spinning cycle and remain in the chamber. The wash water residual might be discharged into the sub-drum via the inlet hole from the chamber. Such the wash water residual is likely to cause contamination and deteriorate dry-spinning efficiency in case the residual is discharged into the sub-drum.

If the check valve closes the inlet hole, the inlet hole is closed right before the completion of the dry-spinning cycle and the wash water residual may be discharged from the chamber via the outlet hole by the centrifugal force. Accordingly, it is possible to minimize the wash water residual in the chamber. In addition, if a small amount of wash water remains in the chamber, the inlet hole is shut off and the wash water is then prevented from being drawn into the sub-drum via the inlet hole. Accordingly, the dry-spinning efficiency may not be deteriorated. Especially, the load of the wash water could open the check valve and it is more preferred that the check valve is provided in a downstream of the inlet hole.

Hereinafter, embodiments will be described using the check valve 71 configured to selectively open and close the inlet hole 77. The embodiments will not exclude that the check valve is configured to selectively open and close the outlet hole.

When the sub-drum 50 is stopped or rotated at a lower RPM than the dry-spinning RPM, the check valve 71 maintains a closing state for the inlet hole 77. Once the sub-drum 50 starts to be rotated at the dry-spinning RPM, the check valve 71 opens the inlet hole 77.

More specifically, the check valve 71 may be configured to open the inlet hole 77 by using the centrifugal force generated when the sub-drum 50 is rotated at the dry-spinning RPM and a water pressure actuated by the inlet hole 77.

Such the check valve 71 may be provided in the chamber 73, in other words, in a downstream of the inlet hole 77 to selectively open the inlet hole 77.

Specifically, the check valve 71 may include an opening/closing member 716 provided selectively in close contact with the inlet hole. When the opening/closing member 716 closely contacts with the inlet hole 77, the discharging area 70 is shut off. When the opening/closing member 716 is spaced apart from the inlet hole 77, the discharging area 70 may be open. The opening/closing member 716 may perform the close contact and the being spaced apart according to the size of the centrifugal force. When the centrifugal force becomes as strong as a threshold or more, the opening/closing member becomes spaced apart. When the centrifugal force is reduced less than the threshold, the opening/closing member may be in close contact by a force of restitution.

More specifically, the opening/closing member 716 may be provided to selectively open and close the inlet hole 77 in a state of being seated on the lower surface of the chamber having the inlet hole 77 formed therein. The opening/closing member 716 may be made of a flexible material to have the force of restitution. One end is fixed to an outer wall of the chamber 73 and the other end of the opening/closing member 716 is extended towards the inner area with respect to the radial direction of the sub-drum 50. Of course, it is not necessary to make the entire area of the opening/closing member 716 of the flexible material. In other words, a foldable area or inlet hole contacting area of the opening/closing member 716 may be made of the flexible material such as rubber or silicon.

The opening/closing member 716 may include a body 714 provided in the downstream of the inlet hole 77 or the upper area of the inlet hole to receive a water pressure via the inlet hole. One end of the body 714 may be a fixing end that is fixed to the chamber and the other end may be a free end not fixed. In other words, the opening/closing member may be provided in a cantilever having one fixing end.

In this instance, as the free end of the body 714 is moved and then bent in the direction in which the centrifugal force is actuated. Accordingly, the opening/closing member 716 may selectively open and close the inlet hole 77 by using the centrifugal force and the water pressure.

As shown in FIG. 8, a fixing area 711 may be provided in the fixing end to couple the fixing end to the inner surface of the chamber 73 as one example. The fixing area 711 may be extended across a longitudinal direction of the extended opening/closing member 716. Both ends of the fixing area 711 may be inserted in an upper fixing groove 524 and a lower fixing groove 525 which are formed in an outer wall of the chamber 73.

Meanwhile, as shown in (A) that is expanded area of FIG. 8, a fixing area 711a as another example may be provided. The fixing area 711a is formed not to be inserted in the outer lateral wall of the chamber 73. The fixing area 711a may have one surface attached to the outer lateral wall of the chamber 73. Here, the outer wall of the chamber 73 is corresponding to an upper cover outer wall 513 which will be described later.

A bent area 713 may be provided in the free end and the bent area may be bent upwardly. The bent area 713 I is extended across the direction in which the centrifugal force is actuated or a longitudinal direction of the body 716. The bent portion 713 may be extended upwardly to form a preset angle with the body 714, when the body 714 is disposed on the lower surface of the chamber 73.

The bent area 713 may be configured to enlarge a folding angle of the body 714. In other words, when a threshold or more centrifugal force is generated, the folding angle may be much larger. Moreover, the bent area 713 may be configured to increase the threshold. In other words, the threshold can be increased more when the bent area 713 is provided than unless it is provided.

Meanwhile, the inlet hole 77 is provided in a lower area of the body 714. Accordingly, the inlet hole 77 may be provided between the free end of the body 714 and the fixing end of the body 714, more specifically, closer to the fixing end than the free end.

Once the sub-drum 50 is rotated, the water pressure and the centrifugal force are actuated in the opening/closing member 716. The water pressure actuated in the body 714 raises the body 714.

Meanwhile, to draw the wash water into the chamber 73 via the inlet hole 77 smoothly, the opening/closing member 716 has to be moved to be spaced a preset distance apart from the inlet hole 77. As one example, the opening/closing member 716 has to be raised. When the inlet hole 77 is arranged adjacent to the free end, the opening/closing member 716 is likely to be raised as far as a preset distance only by the water pressure. However, when the inlet hole 77 is arranged adjacent to the fixing end, only the water pressure is not sufficient to raise the opening/closing member 716 as far as a preset distance. In other words, the opening/closing member 716 could not be raised as far as the preset distance according to the location of the inlet hole 77.

In this embodiment, the inlet hole 77 is provided adjacent to the fixing end. To raise the opening/closing member 716 as far as the preset distance from the inlet hole 77, the centrifugal force may be additionally used. Such the centrifugal force may be actuated to move the body 714 and the bent area 713 far from the center of the sub-drum 50.

The centrifugal force actuated in the body 714 may be actuated in a proximately longitudinal direction of the body 714 such that it can slightly contract the body 714 in a longitudinal direction but cannot move the body in other directions.

The centrifugal force actuated in the bent area 713 may generate a bending stress in the body 714 and a rotational force in the fixing area 711 at the same time. As deformed by the centrifugal force, the body 714 is rotated on the fixing end. In this instance, the deformation is generated to increase the curvature from the fixing end towards the free end of the opening/closing member 716.

Once the rotation of the sub-drum 50 stops, the opening/closing member 716 re-closes the inlet hole 77 by the weight and restitution force of the opening/closing member 716.

Meanwhile, the thickness and hardness of the opening/closing member 716 may be adjusted to make the restitution force smaller than the centrifugal force generated by the sub-drum 50 rotated at the dry-spinning RPM. The dry-spinning RPM may be determined based on various factors such as the capacity, shape, diameter and depth of the sub-drum 50 and it may be set as approximately 100 rpm through 270 rpm. The opening/closing member 716 may be formed to open the inlet hole 77 at a preset rpm in range of the dry-spinning rpm to discharge the wash water via a discharging path 47 after passing through the outlet hole 79. Such a preset rpm may include approximately 120 rpm through 130 rpm. Meanwhile, the numeral range mentioned in the present disclosure is exemplary and the embodiments of the present disclosure are not limited to the numeral range.

Referring to FIGS. 9, 10 and 11, the check valve 71 may be formed in a plate shape and include a plurality of opening/closing members 716 spaced a preset distance apart from each other; one fixing area 711 integrally formed with each one end of the opening/closing members 716; a reinforcing rib 712 provided in an upper surface of each opening/closing member 716; and a bent area 713 provided in each of the other ends of the opening/closing members 716.

In other words, one check valve 71 may be used in open and close the plurality of the inlet holes 77 in this embodiment. The check valve 71 may be formed as one body. The check valve having one body may be easily formed by using a flexible material such as rubber or silicon. In other words, the check valve having the complex shape may be easily formed.

The fixing area 711 may be fixed to the outer wall of the chamber 73 and the outer wall of the chamber 73 may be formed as a curved surface. When the outer wall of the chamber 73 is formed as the curved surface, the fixing area 711 also has one surface having a corresponding curvature to the curvature of the outer wall. Such the fixing area 711 may be longitudinally formed along the rotational direction of the sub-drum 50.

The plurality of the opening/closing members 716 may be provided in parallel with the longitudinal direction of the fixing area 711, in other words, the rotational direction of the sub-drum 50 and coupled to the other surface located in opposite to one surface of the fixing area 711. When the other surface of the fixing area 711 is formed as the curved surface like one surface, the plurality of the opening/closing members 716 may be spaced a preset distance apart from each other. If the opening/closing members 716 are coupled to the fixing area 711 in a state of contacting with each other, the other ends are hardly raised while one ends are fixed to the fixing area 711.

The opening/closing members 716 made of the flexible material are likely to interfere with each other, while deformed and raised. The reinforcing rib 712 may be extended from the upper surface of each opening/closing member 716 in the rotational direction of the sub-drum 50 so as to prevent such interference between the opening/closing members 716.

Moreover, an opening/closing guide 529 may be provided between each two of the opening/closing members 716 to open and close the inlet hole 77 by guiding the opening/closing members 716. The opening/closing guide 529 may be upwardly projected from the lower surface of the chamber 73.

A projected area 715 may be provided in a lower surface of each opening/closing member 716 to be inserted in the inlet hole 77. In other words, the projected area and the inlet hole may contact with each other in multi-surfaces, not one-surface. Accordingly, effective closing can be facilitated and the wash water can be drawn more smoothly once the closing is released. In other words, as a neighboring area of the inlet hole 77 and the lower surface of the opening/closing member 716 contact with each other, the inside of the chamber 73 may be water-sealed from the inside of the sub-drum 50. Also, as the projected area 715 is inserted in the inlet hole 77, an outer circumferential surface of the projected area 715 and an inner circumferential surface of the inlet hole 77 contact with each other and the water-sealing may be more effectively performed.

Meanwhile, the inlet hole 77 may include an expanded area 527 formed to make a diameter of the upper end larger than a diameter of a lower area. That is because the projected area 715 can be easily inserted in the inlet hole 77. In this instance, the projected area 715 may be inserted in the inlet hole 77 and seated on a bottom surface of the expanded area 527. The lower surface of the projected area 715 is very narrow and load is likely to be concentrated on a contact area with the bottom surface of the expanded area 527. Because of that, the water-sealing may be kept.

The inlet hole 77 shown in FIG. 8 may be formed in a slit shape extended longitudinally. In this instance, the projected area 715 is also formed in a corresponding shape to be inserted in the slit.

Meanwhile, the sub-drum 50 may include a body 53 for accommodating wash water and laundry; and a sub cover having a laundry introduction opening 515 formed therein. As the body 53 is coupled to the sub cover, the chamber 73 may be formed. Also, as the body 53 is coupled to the sub-cover, the check valve may be fixed.

In this instance, a second uneven area 535 may be provided in an outer circumferential surface of the body 53. The sub cover is likely to be separate from the body 53 by the weight of the wash water and laundry held in the body 53. Moreover, the discharging area 70, the guide rib 531, the handle, the inner water supply guide 560 and the outer water supply guide 570 may be also provided in the sub cover.

The sub cover may include a lower cover 52 coupled to an upper end of the body 53; and an upper cover 51 coupled to an upper area of the lower cover 52. The sub cover may include only the upper over 51. The lower cover 52 may be integrally formed with the body 53 of the sub-drum. At this time, the laundry introduction opening may be formed by the upper cover 51.

The upper cover 51 may be disposed in an edge area of the upper end and a predetermined space with an open top may be provided to define some of the chamber 73. The inlet hole 77 and the first outlet hole 791 may be provided in the lower cover. In this instance, the first outlet hole 791 may form the outlet hole 79, together with a second outlet hole 792 which will be described later.

The lower cover 52 may be configured to be coupled to the body 53. In other words, the lower cover 52 may be coupled to the upper area of the body 53. After that, the upper cover 51 may be coupled to the lower cover 52 and the body 53.

Accordingly, the discharging area of the sub-drum may be formed by the coupling of the two components including the sub-drum body and the sub cover or the three components including the body, the upper cover and the lower cover. Accordingly, the sub-drum having the discharging area may be fabricated easily and smoothly. When the check valve is provided, the check valve is fixedly mounted after the coupling of the components.

Specifically, the lower cover 52 may include a rib 75 provided to define the lower surface of the chamber 73; and a lower cover lateral wall 523 provided to define an outer wall of the chamber 73. The rib 75 and the lower cover lateral wall 523 may define the chamber 73, together with an upper cover outer wall 513 and an upper cover inner wall 515 which will be described later. The inlet hole 77 may be provided in the rib 75 and the first outlet hole 791 may be provided in the lower cover lateral wall 523.

Meanwhile, a lower fixing groove 525 is formed in the rib 75, adjacent to the lower cover lateral wall 523. A lower end of the fixing area 711 is fixedly inserted in the lower fixing groove 525.

The upper cover 51 is provided with a space with an open lower surface and configured to define the chamber, together with the lower cover 52. The space is formed by the upper cover outer wall 513 and the upper cover inner wall 515 which are seated in the space defined by the lower cover 52. Here, an upper end of the upper cover outer wall 513 and an upper end of the upper cover inner wall 515 may be coupled to each other.

Accordingly, when the upper cover 51 is coupled to the lower cover 52, the chamber 73 surrounded by the upper cover outer wall 513, the upper cover inner wall 515, the lower cover lateral wall 523 and the rib 75 may be formed. Meanwhile, an outer surface of the upper cover inner wall 515 may have a recessed area 561.

A second outlet hole 792 is formed through the upper cover outer wall 513 to form the outlet hole 79, together with the first outlet hole 791. The second outlet hole 792 is located at the same height with the first outlet hole 791 and has the same or larger area with the first outlet hole 791.

An upper fixing groove 524 is provided in a lower end of the upper cover outer wall 513 to fixedly insert the fixing area 711 therein. The upper cover outer wall 513 may include a support projection 551 and a pressing projection 552 which are provided side by side, spaced a preset distance apart from a lower end.

The support projection 551 may be inserted in the lower fixing groove 525 and configured to support the weight of the upper cover 51. The pressing projection 552 may be configured to press the opening/closing member 716. The fixing area 711 is fixedly inserted between the support projection 551 and the pressing projection 552.

The upper cover 51 includes a coupling guide 581 configured to guide the coupling process to the lower cover 52. Openings are formed in upper surfaces of the upper and lower covers 51 and 52, respectively, to form the laundry introduction opening 515 through the coupling between the upper cover 51 and the lower cover 52. The coupling guide 581 may be provided as a flange extended from an inner surface of the opening formed in the upper cover 51. The coupling guide 581 may be provided adjacent to the short distance area (C2). Once the upper cover 51 and the lower cover 52 are coupled to each other, the coupling guide 581 may contact with the inner surface of the opening formed in the lower cover 52.

When the coupling guide 581 is installed, wash water will not freely fall. In other words, the wash water forms a flux 45 of which a moving direction is drastically changed to the lower area by the lower surface of the coupling guide 581 as flowing along a lower area of the upper surface of the sub-drum in a horizontal direction. In other words, some of the horizontal-element speed is converted into a vertical-element speed. The wash water of which the moving direction is drastically changed may be collided with the laundry held in the sub-drum 50 more strongly than the freely falling wash water. Accordingly, a strong shock is applied to the laundry held in the body of the sub-drum 50 only to enhance the washing efficiency. A slope of the coupling guide 581 with respect to the direction of the gravity may be set as diverse angles based on the experimental values.

Meanwhile, when the sub-drum 50 is rotated at a high rotation speed, the wash water held in the sub-drum 50 is collided with each other to splash towards the laundry introduction opening 515. At this time, the coupling guide 581 may guide to form the flux 45 provided to move the splashed water into the sub-drum 50 along an upper surface.

Hereinafter, the process of the laundry treating apparatus according to one embodiment will be described sequentially.

First of all, the user classifies the laundry into two groups which are not proper to be washed together and loads them into the drum 30 and the sub-drum 50, respectively. Then, the user locates the sub-drum 50 in the drum 30 and couples the first uneven area and the second uneven area to each other.

Once the sub-drum 50 is coupled to the drum 30 after mounted in the upper end of the drum 30, the water supply unit 18 starts to supply water to the drum 30 and the sub-drum 50.

For the water supply, the drum 30 is rotated to a preset angle to locate the inner water supply guide 560 and the outer water supply guide of the sub-drum 50 under the water supply unit 18. At this time, the sub-drum 50 is supplied the rotational force of the drum 30 through the first and second uneven areas 312 and 535 and rotated together with the drum 30.

In other words, the inner water supply guide 560 is located under the water supply unit 18 and the water supply unit is open. After that, the wash water is supplied to the sub-drum 50 via the inner water supply guide 560 and the sub-drum 50 is then rotated to a preset angle to locate the outer water supply guide 560 under the water supply unit 18. After that, the water supply unit is open again and the wash water is supplied to the drum 30 via the outer water supply guide 560.

After the completion of the water supply, the drum 30 starts the rotation to perform the washing process, in other words, the washing cycle, the rinsing cycle and the dry-spinning cycle. The sub-drum 50 is provided with the rotational force from the drum 30 and rotated at the same rotation speed with the drum 30.

Once the sub-drum 50 is rotated, the wash water held in the sub-drum 50 is rotated along the inner circumferential surface of the sub-drum 50. The sub-drum 50 has the cross section area formed in an oval shape and water currents are formed therein. Accordingly, the friction between the laundry increases enough to increase the washing performance.

When the rotation speed of the sub-drum 50 increases, the wash water slowly rises while rotated along the inner circumferential surface and the flux 45 is formed by the guide rib 531. In other words, the flow direction of the wash water circulated along the inner circumferential surface of the sub-drum 50 is changed by the collision with the guide rib 531 to raise the wash water and fall towards the center of the sub-drum 50. Such the flux of the wash water may enhance the washing performance.

The wash water held in the sub-drum 50 rotated at a high rotation speed is collided with each other and some of the wash water is raised to fall to the coupling guide 581 formed in the laundry introduction opening 515 only to form another flux 46 for collecting the water in the sub-drum 50.

During the washing cycle in which the sub-drum 50 is rotated at the washing RPM, the RPM is not so high enough to move the wash water against the centrifugal force even while rotated and raised along the inner circumferential surface, such that the wash water may not be drawn into the inlet hole 77. If the wash water reaches an entrance of the inlet hole 77, the check valve 71 closes the inlet hole 77 to prevent the wash water from being drawn into the chamber 73.

When the dry-spinning cycle configured to rotate the sub-drum 50 at the dry-spinning RPM higher than the washing RPM starts, the wash water is drawn into the inlet hole 77 open by the check valve 71 and raised again to be discharged into the discharging path 47 via the outlet hole 79.

Specifically, when the sub-drum is rotated at the dry-spinning RPM, the water pressure and the centrifugal force are actuated to the body 714 and the bent area 713.

The water pressure and the centrifugal force are applied to the body 714 along the longitudinal direction only to slightly contact the body 714, not open the inlet hole 77.

Moreover, the centrifugal force is also actuated in the bent area 713 provided in the upper surface of the opening/closing member 716 and the foldable stress is generated in the opening/closing member 716. Accordingly, the other end of the opening/closing member 716 is raised to open the inlet hole 77. At this time, the opening/closing member 716 starts to be bent upwardly and bent more in the direction of the centrifugal force such that the deformation performed to increase the curvature towards the other end from one end having the fixing area 711 provided therein. As the material used in making the opening/closing member 716 is more flexible, the curvature is increased more.

When the inlet hole 77 is open, the wash water passes through the inlet hole and is raised in the chamber 73 by the centrifugal force to be discharged outside via the outlet hole 79. The outlet hole 79 is lower than the cover bent area 713 and 21*a* of the tub cover and higher than the upper surface of the balancer, such that the wash water discharged via the outlet hole 79 may be discharged to the discharging path 47.

The wash water discharged to the discharging path 47 will not be drawn into the drum 30. The centrifugal force generated by the rotation of the drum 30 is actuated and it is not easy to draw the wash water into the drum 30. The wash water falls along the inner circumferential surface of the tub 20 to be discharged outside by the drainage device.

Figure 12:
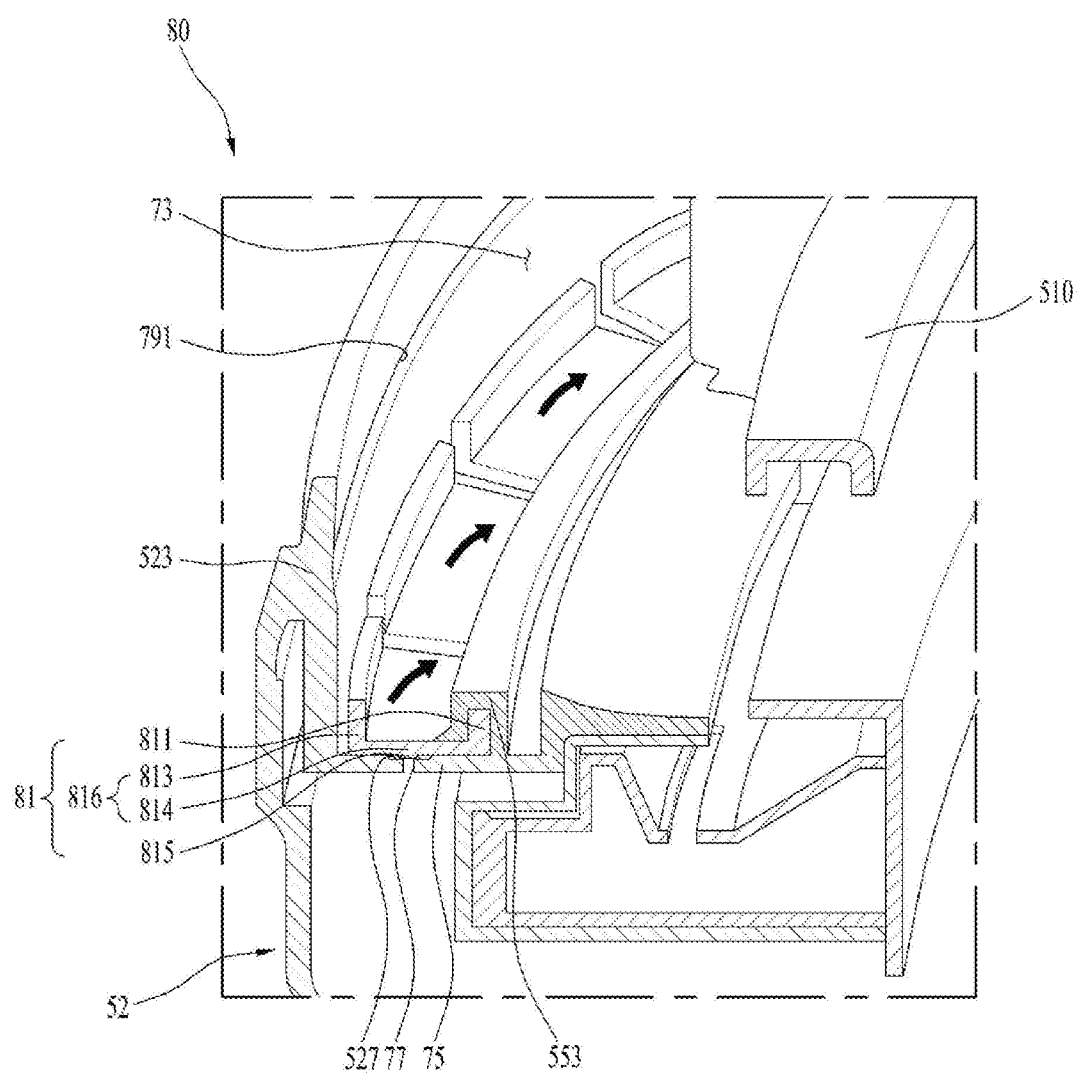
FIG. 12 is a sectional diagram illustrating a lateral surface of a sub-drum discharging area in accordance with another embodiment.

Hereinafter, referring to FIG. 12, another embodiment of the discharging area 80 will be described in detail. FIG. 12 illustrates no sub-cover to clearly show the structure of the discharging area 80 and the discharging area 80 provided in the lower cover 52.

The other configuration of the discharging area 80 according to this embodiment is equal to the corresponding configuration of the discharging area according to the above-noted embodiment, except the check valve 81. The same numeral references are given to the same components and detailed description is omitted accordingly.

The discharging area 80 includes the chamber for defining a space for accommodating wash water; an inlet hole 77 provided to draw the wash water into the chamber 73; and an outlet hole 79 provided to discharge the wash water from the chamber. Moreover, the discharging area 80 may include a check valve 81 configured to selectively open and close the inlet hole 77 according to the size of the water pressure of the wash water drawn into the inlet hole 77.

A free end of the check valve 81 may be located in an outer area with respect to a radial direction of a fixing end. The free end of the check valve 71 according to the above embodiment may be located in an inner area with respect to the radial direction of the fixing end.

The check valve 81 may include an opening/closing member 816 provided in the chamber 73 and seated on a lower surface of the chamber 73 having the inlet hole 77 formed therein. The opening/closing member 816 repeatedly opens and closes the inlet hole 77 while located in a first position configured to close the inlet hole 77 in a state of being seated on the lower surface of the chamber 73 by the weight thereof and a second position configured to open the inlet hole 77 as raised by the water pressure.

The opening/closing member 816 may be made of a flexible material to have a force of restitution and includes a fixing end fixed to the chamber 73; a free end spaced apart in a direction getting farther from the center of the sub-drum 50; and a body 814 provided above the inlet hole 77 to receive the water pressure via the inlet hole 77 and connecting the fixing end and the free end with each other.

The fixing end is oriented towards the inner area with respect to the radial direction of the sub-drum 50 and the free end is oriented towards the outer area with respect to the radial direction of the drum 50.

When the centrifugal force of the rotating sub-drum 50 is actuated in a state of the opening/closing member 816 closing the inlet hole 77 due to its weight, the wash water rises along the inner circumferential surface of the sub-drum 50 and presses the opening/closing member 816 closing the inlet hole 77. Here, the inlet hole 77 is provided closer to the free end than the fixing end such that the opening/closing member 816 can be raised as far as a preset distance only by the water pressure, different from the embodiment described above.

At this time, the weight of the opening/closing member 816 has to be set to be equal to or larger than the force applied to the opening/closing member 816 by the wash water, when the sub-drum 50 is rotated at the washing RPM to press the wash water downwardly, and smaller than the force applied to the opening/closing member by the wash water when the sub-drum 50 is rotated at the dry-spinning RPM higher than the washing RPM to press the wash water.

Accordingly, the weight of the opening/closing member 816 may be preset by adjusting the volume or intensity. However, mass may be concentrated on one side of the opening/closing member 816 to facilitate more close contact between some area of the lower surface of the opening/closing member 816 and some area near the inlet hole 77.

For that, a mass 813 may be provided in the free end oriented towards the outer area with respect to the radial direction of the sub-drum 50. The mass 813 may be formed in diverse shapes and projected from an upper surface of the body 814 as shown in FIG. 8.

The mass 813 projected from the upper surface will cross the direction of the centrifugal force and the centrifugal force applied to the mass 813 closes the inlet hole 77 by rotating the opening/closing member 816 in the counterclockwise direction in FIG. 12, together with its weight.

Accordingly, the opening/closing member 816 opens the inlet hole 77 by using the water pressure when the sub-drum 50 is rotated at the dry-spinning RPM. At this time, the water pressure generated through the inlet hole 77 is larger than its weight and the rotational force of the opening/closing member 816 generated by the centrifugal force.

Moreover, the opening/closing member 816 closes the inlet hole 77 by using its weight and centrifugal force when the sub-drum 50 is rotated or stopped at a preset RPM lower than the dry-spinning RPM. At this time, the water pressure generated by the inlet hole 77 may be smaller than its weight and the rotational force generated by the centrifugal force.

The opening/closing member 816 may include a fixing area 811 configured to be fixedly inserted in a fixing groove 553 which will be described later. The fixing area 811 may be projected from the upper surface of the opening/closing member 816 as shown in FIG. 12 and the embodiments of the present disclosure are not limited thereto.

The fixing groove 553 is projected from a rib 75 provided on the cross section area of the sub-drum 50 and the fixing area 811 is inserted in the space formed in the fixing groove 553. The fixing groove 553 is spaced apart from the lateral wall of the sub-drum 50 to orient the mass 813 of the opening/closing member 816 towards the outer area with respect to the radial direction of the sub-drum 50 and the fixing area 811 of the opening/closing member 816 towards the inner area with respect to the radial direction of the sub-drum 50, while the opening penetrated by the opening/closing member 816 is oriented towards the lateral wall of the sub-drum 50.

Meanwhile, the fixing groove 553 may be longitudinally formed along the lateral wall of the sub-drum 50, with a preset curvature. Even in this instance, the fixing groove 553 is spaced apart from the sub-drum 50 and the opening is formed in an outer circumferential surface of the fixing groove 553 to be oriented towards the lateral wall of the sub-drum 50.

Such the opening is extended along a longitudinal direction of the fixing groove 553. The plurality of the opening/closing members 816 may be arranged in the opening in the longitudinal direction of the fixing groove 553. Accordingly, when the opening/closing members 816 are raised, mutual interference might occur between the opening/closing members 816. If such interference occurs, the inlet hole 77 might fail to be open sufficiently by the opening/closing members. To prevent that, the opening/closing members 816 may be spaced a preset distance apart from each other.

Meanwhile, when the plurality of the opening/closing members 816 is provided, the distance between each two of them becomes narrower as raised upwardly. Accordingly, the opening/closing guide described in the above embodiment is not provided.

Figure 13:
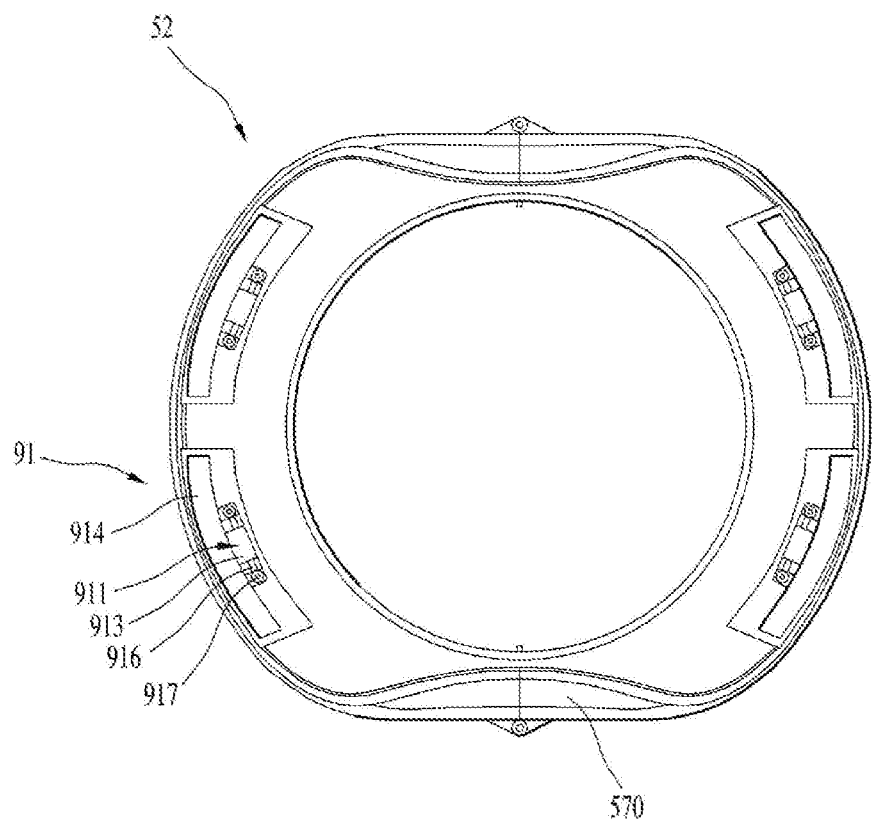
FIG. 13 is a plan view illustrating a sub-drum discharging area in accordance with a further embodiment.
Figure 14:
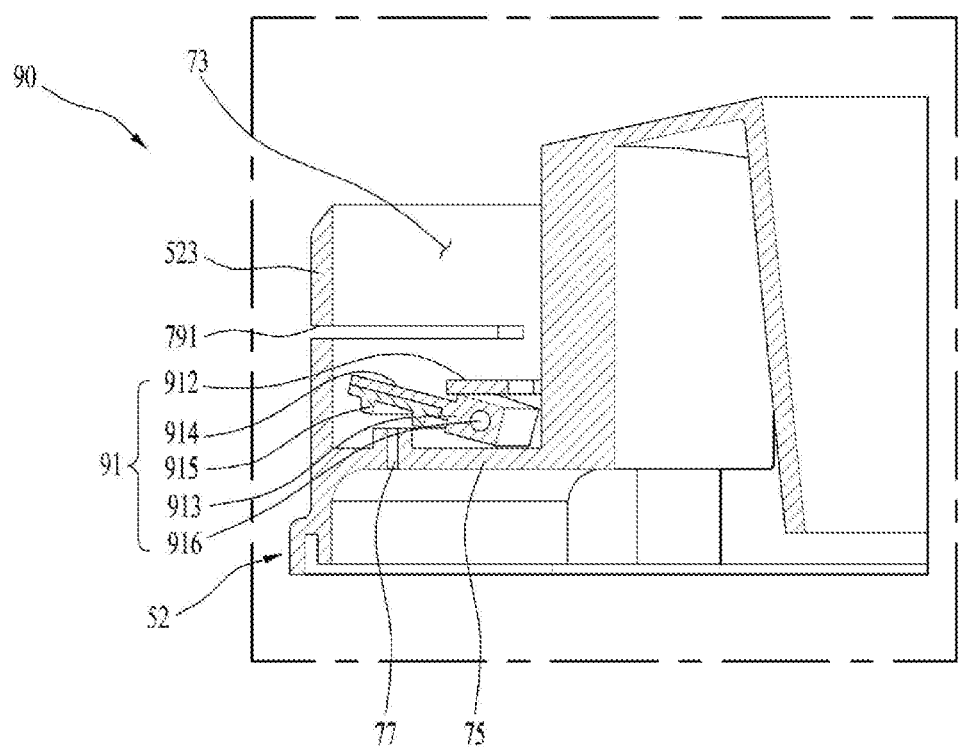
FIG. 14 is a sectional diagram illustrating a lateral surface of the discharging area shown in FIG. 13.

Hereinafter, referring to FIGS. 13 and 14, a discharging area 90 in accordance with a further embodiment will be described in detail. FIG. 13 is a plan view illustrating the discharging area 90 in accordance with a further embodiment and FIG. 14 is a sectional diagram illustrating a lateral surface of the discharging area 90 shown in FIG. 13.

The discharging area 90 according to this embodiment which will be described hereinafter has the same configuration with the configuration according to the embodiment described above, except a check valve 91. Accordingly, the same numeral references are used and detailed description thereof is omitted.

The check valve 91 may include an opening/closing member 914 seated on a lower surface of the chamber 73 having the inlet hole 77 therein; and a hinge unit 911 rotatably coupled to the opening/closing member 914. The check valve according to the above-noted embodiments is configured to be foldable by its elasticity and the check valve according to this embodiment uses the hinge structure allowing rotation. Of course, the reasons causing such modification or motion are the same.

The opening/closing member 914 includes one end oriented towards the center of the sub-drum 50; and the other end located in opposite to one end. The opening/closing member 914 is rotatable on one end connected with the hinge unit 911. Accordingly, the opening/closing member 914 repeatedly opens and closes the inlet hole 77 while located in a first position configured to close the inlet hole 77 in a state of being seated on the lower surface of the chamber 73 by the weight thereof and a second position configured to open the inlet hole 77 as raised by the water pressure.

At this time, the weight of the opening/closing member 914 has to be set to be equal to or larger than the force applied to the opening/closing member 914 by the wash water, when the sub-drum 50 is rotated at the washing RPM to press the wash water downwardly, and smaller than the force applied to the opening/closing member by the wash water when the sub-drum 50 is rotated at the dry-spinning RPM higher than the washing RPM to press the wash water.

Meanwhile, a neighboring area of the inlet hole 77 may be upwardly projected to facilitate the secure water-seal between the inside of the sub-drum 50 and the inside of the chamber 73 by contacting the opening/closing member 914 with the neighboring are of the inlet hole 77.

If the projected height of the neighboring area is too high or low, the flat lower surface of the opening/closing member 914 could not closely contact with the neighboring area of the inlet hole 77. Accordingly, the lower surface of the opening/closing member 914 may be made of a flexible material and a projected area 915 may be provided to accommodate the neighboring area of the inlet hole 77. The projected area 915 may have a recessed area formed in the center of the lower surface to accommodate the neighboring area of the inlet hole 77.

The hinge unit 911 includes a hinge body 913 connected with one end of the opening/closing member 914 and having a through-hole formed therein; a shaft support area 917 rotatably supporting the shaft 916. It is described that the hinge unit 911 has the independent hinge body 913 but it is for easy description sake. Accordingly, one end of the opening/closing member 914 may be the hinge body 913.

The hinge body 913 is spaced apart from an upper surface of the rib 75 to be rotatable on the shaft 916 smoothly. Meanwhile, when the pressure of the wash water drawn via the inlet hole 77 is high, the opening/closing member 914 may be rotated to 90 degrees or more from the upper surface of the rib 75. In this instance, there is no auxiliary force of restitution and the opening/closing member 914 could not return to the first position for closing the inlet hole 77 even when the pressure of the wash water becomes lower.

Accordingly, the second position has to be set to allow the opening/closing member 914 to return to the first position due to its weight. For that, the check valve 91 may further include a stopper arranged in an upper area of the hinge body 913. The stopper 912 may be upwardly spaced apart from the hinge body 913 to smoothly rotate the hinge body 913.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

Industrial applicability of various aspects of the present disclosure is included in the description of the specific embodiments.

What is claimed is:
1. A laundry treating apparatus comprising:
a tub configured to hold wash water;
a drum rotatably supported in the tub, the drum comprising a shaft disposed perpendicular with the ground;
a sub-drum detachably mounted to the drum, the sub-drum being configured to wash laundry independently from the drum, wherein
the sub-drum comprises:
a sub-drum body having a container-like shape configured to accommodate wash water and laundry;

a sub-drum cover coupled to a top of the sub-drum body and having a laundry introduction opening for loading the laundry, wherein the sub-drum cover comprises,
  a lower cover that is one of integrally formed with the sub-drum body or coupled to the sub-drum body, wherein an inlet hole and an outlet hole are defined in the lower cover;
  an upper cover coupled to a top surface of the lower cover;
  a chamber being defined in between the lower cover and the upper cover;
a discharging area defining a discharging path through which wash water is selectively discharged from the sub-drum by a centrifugal force generated by rotation of the sub-drum, wherein the discharging area comprises,
  the chamber defined independently from a space in which washing is performed, the chamber being configured to receive wash water from the sub-drum;
  the inlet hole of the lower cover being configured to draw the wash water into the chamber; and
  the outlet hole of the lower cover being configured to discharge the wash water from the chamber outside the sub-drum; and
a check valve configured to selectively open and close the discharging area based on an external force applied to the check valve by the centrifugal force generated by the rotation of the sub-drum,
wherein the upper cover is configured to apply a downward pressure to one side of the check valve to fix the check valve when the upper cover is coupled to the lower cover.

2. The laundry treating apparatus according to claim 1, wherein a cross sectional area of the chamber is larger than cross sectional areas of the inlet and outlet holes.

3. The laundry treating apparatus according to claim 2, wherein the outlet hole is located in an outer upper area of the discharging area, the outlet hole being positioned above the inlet hole with respect to gravity and radially outward from the inlet hole.

4. The laundry treating apparatus according to claim 1, wherein the check valve is configured to selectively open and close the inlet hole.

5. The laundry treating apparatus according to claim 1, wherein the check valve is disposed in the chamber, and the check valve comprises a check valve body, the check valve body comprising a fixing end configured to fix one side of the check valve, and a free end at an opposite side of the check valve body, the free end being configured to move within the chamber when acted on by the centrifugal force.

6. The laundry treating apparatus according to claim 5, wherein the check valve is configured to selectively open and close the discharging area as the check valve body moves within the chamber from a position spaced a preset distance apart from the inlet hole to a position adjacent to the inlet hole.

7. The laundry treating apparatus according to claim 6, wherein the inlet hole is disposed between the fixing end and the free end of the check valve body, and
the inlet hole is closer to the fixing end than the free end.

8. The laundry treating apparatus according to claim 5, wherein the check valve is configured to selectively open and close the discharging area as the free end of the check valve body bends when acted on by the centrifugal force.

9. The laundry treating apparatus according to claim 1, wherein the check valve comprises,
  a check valve body, the check valve body comprising a fixing end configured to fix one side of the check valve, and a free end configured to be movable within the chamber when acted on by a water pressure of the wash water generated by the centrifugal force.

10. The laundry treating apparatus according to claim 9, wherein the check valve is configured to be movable from a first position for closing the discharging area to a second position for opening the discharging area when acted on by the water pressure of the wash water.

11. The laundry treating apparatus according to claim 10, wherein the check valve is in the second position with the free end bending in an opposite direction from a direction in which the free end bends before the centrifugal force is actuated in the first position of the check valve.

12. The laundry treating apparatus according to claim 1, wherein the inlet hole is one of a plurality of inlet holes of the discharging area; and
  the check valve comprises a fixing area, and an opening/closing member independently rotatable with respect to the fixing area and configured to open and close each of the inlet holes.

* * * * *